US012785547B2

(12) United States Patent
Chang et al.

(10) Patent No.: US 12,785,547 B2
(45) Date of Patent: Nov. 3, 2026

(54) POWER MODULE, POWER SUPPLY SYSTEM, VEHICLE, AND PHOTOVOLTAIC SYSTEM

(71) Applicant: Huawei Digital Power Technologies Co., Ltd., Shenzhen (CN)

(72) Inventors: Yao Chang, Shanghai (CN); Jianrui Xue, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 107 days.

(21) Appl. No.: 19/009,701

(22) Filed: Jan. 3, 2025

(65) Prior Publication Data

US 2025/0141345 A1 May 1, 2025

Related U.S. Application Data

(63) Continuation of application No. PCT/CN2023/105152, filed on Jun. 30, 2023.

(30) Foreign Application Priority Data

Jul. 5, 2022 (CN) ........................ 202210782904.9

(51) Int. Cl.
*H02M 1/32* (2007.01)
*B60L 8/00* (2006.01)
(Continued)

(52) U.S. Cl.
CPC ............. *H02M 1/327* (2021.05); *B60L 8/003* (2013.01); *G01K 7/01* (2013.01); *H02M 7/5387* (2013.01); *B60L 2210/40* (2013.01); *H02M 7/003* (2013.01)

(58) Field of Classification Search
CPC ..... G06F 1/263; H02M 1/10; H02M 3/33561; H02M 7/003; H02M 1/088; H02M 3/088;
(Continued)

(56) References Cited

U.S. PATENT DOCUMENTS

| | | | | |
|---|---|---|---|---|
| 7,952,368 B1 * | 5/2011 | Dai | .................... | G01R 31/2635 374/178 |
| 11,183,834 B2 * | 11/2021 | Aoki | .................... | H02H 1/0007 |
| 2024/0162196 A1 * | 5/2024 | Konishi | ............. | H10W 40/255 |

FOREIGN PATENT DOCUMENTS

| | | |
|---|---|---|
| CN | 102790043 A | 11/2012 |
| CN | 104090224 A | 10/2014 |

(Continued)

*Primary Examiner* — Jeffrey A Gblende
(74) *Attorney, Agent, or Firm* — Leydig, Voit & Mayer, Ltd.

(57) ABSTRACT

A power module includes a first power semiconductor chip, a first temperature sensor, a first diode chip, and a first circuit board. The first power semiconductor chip includes a first output electrode. The first temperature sensor is located inside the first power semiconductor chip, a first cathode of the first temperature sensor is electrically connected to the first output electrode. The first diode chip is electrically connected to the first power semiconductor chip, and a voltage is generated between the first output electrode and the first cathode when the first diode chip generates a reverse recovery current. The first circuit board is configured to obtain a first voltage difference between the first output electrode and the first cathode, to obtain a temperature of the first diode chip. The power module in this application can accurately and quickly detect temperatures of the first power semiconductor chip and the first diode chip.

11 Claims, 10 Drawing Sheets

(51) Int. Cl.
*G01K 7/01* (2006.01)
*H02M 7/5387* (2007.01)
*H02M 7/00* (2006.01)

(58) Field of Classification Search
CPC .. H02M 3/1584; H02M 3/1566; H02M 1/084; H02M 3/003; H02M 3/33523; H01L 25/112; H01L 25/115; H01L 23/34; H01L 23/528; H01L 27/088; H01L 29/088; H01L 29/2003; H01L 23/49503; H01L 23/49562; H01L 23/49575; H01L 23/62; H01L 23/072; H01L 23/0248; H01L 29/1033; H01L 29/402; H01L 29/41758; H01R 13/6675; H01R 29/00; H01R 31/065; G09G 3/20; H02K 11/046; H01F 2027/406; H01F 27/30; H01F 41/0246; H05K 7/20927; H05K 2201/10166; H05K 2201/10507; H05K 7/2089; H05K 1/18
See application file for complete search history.

(56) References Cited

FOREIGN PATENT DOCUMENTS

| | | | |
|---|---|---|---|
| CN | 105207449 | A | 12/2015 |
| CN | 105572558 | A | 5/2016 |
| CN | 105928637 | A | 9/2016 |
| CN | 110865290 | A | 3/2020 |
| CN | 115377077 | A | 11/2022 |

* cited by examiner

POWER MODULE, POWER SUPPLY SYSTEM, VEHICLE, AND PHOTOVOLTAIC SYSTEM

CROSS-REFERENCE TO RELATED APPLICATIONS

This application is a continuation of International Application No. PCT/CN2023/105152 filed on Jun. 30, 2023, which claims priority to Chinese Patent Application No. 202210782904.9 filed on Jul. 5, 2022. The disclosures of the aforementioned applications are hereby incorporated by reference in their entireties.

TECHNICAL FIELD

This application relates to the field of power module technologies, and in particular, to a power module, a power supply system, a vehicle, and a photovoltaic system.

BACKGROUND

With development of power electronics technologies, a power module has attracted increasing attention. The power module generates heat in a working process. Especially when the power module is lighter and miniaturized, current density of the power module increases. As a result, high heat is generated inside the power module. This affects thermo-mechanical performance and reliability of the entire power module. In view of this, when the power module runs, a temperature of the power module needs to be detected in real time to improve running reliability of the power module. The power module usually includes a power semiconductor chip and a diode chip, and temperature detection on the diode chip is usually ignored in the conventional technology.

SUMMARY

This application provides a power module that can accurately and quickly detect temperatures of a power semiconductor chip and a diode chip, a power supply system, a vehicle, and a photovoltaic system.

According to a first aspect, this application provides a power module. The power module includes a first power semiconductor chip, a first temperature sensor, a first diode chip, and a first circuit board. The first power semiconductor chip includes a first output electrode. The first temperature sensor is located inside the first power semiconductor chip, and is configured to detect a temperature of the first power semiconductor chip. The first temperature sensor includes a first cathode, and the first cathode is electrically connected to the first output electrode. The first diode chip is electrically connected to the first power semiconductor chip, and when the first diode chip generates a reverse recovery current, a voltage is generated between the first output electrode and the first cathode. The first circuit board is electrically connected to the first output electrode and the first cathode. The first circuit board is configured to obtain a first voltage difference between the first output electrode and the first cathode, and obtain a temperature of the first diode chip based on the first voltage difference.

A first gate is disposed on the first power semiconductor chip, and is configured to control turn-on and turn-off of the first power semiconductor chip. The first power semiconductor chip may be an IGBT, an MOSFET, or another power semiconductor chip. In an implementation, the first power semiconductor chip is an IGBT chip, and the first output electrode is an emitter of the IGBT chip. In an implementation, the first power semiconductor chip is an MOSFET chip, and the first output electrode is a source of the MOSFET chip.

An outer surface of the first temperature sensor is electrically insulated from an outer surface of the first power semiconductor chip, and the first cathode is electrically connected to the first output electrode through a connection cable, to implement an electrical connection between the first temperature sensor and the first power semiconductor chip. In an implementation, the first temperature sensor is a diode temperature sensor. In an implementation, the first temperature sensor is located in a main area in which the first power semiconductor chip generates a junction temperature. If the first temperature sensor is closer to a main area in which the IGBT chip generates a junction temperature, temperature that is of the IGBT chip and that is detected by the first temperature sensor is more accurate.

The first diode chip may be configured to protect a circuit. In an implementation, the first diode chip may be an FRD chip. In another implementation, the first diode chip may alternatively be another diode chip. When the first diode chip is forward turned on, a current flows from an anode of the first diode chip to a cathode of the first diode chip. When the current input to the first diode chip gradually decreases to zero, there is a reverse recovery process when the current on the first diode chip changes from forward turning on to cutoff. The current on the first diode chip does not immediately change to zero, but changes from a forward current to a large reverse current. In this case, the current flows from the cathode of the first diode chip to the anode of the first diode chip, and the reverse current gradually decreases to zero or approaches zero. In this case, the first diode chip enters an off state, a current that changes from the reverse current to zero is referred to as a reverse recovery current. The reverse recovery current of the first diode chip flows into the first power semiconductor chip. A change rate of the reverse recovery current is affected by a junction temperature of the first diode chip, and decreases as the junction temperature increases. In other words, a smaller change rate of the reverse recovery current indicates a higher temperature of the first diode chip. Correspondingly, parasitic inductance caused by a package structure exists between the first output electrode and the first cathode. The change rate of the reverse recovery current may generate an induced voltage, that is, the first voltage difference, on the first output electrode and the first cathode.

A data collection unit and a processing unit are disposed on the first circuit board. The data collection unit obtains the first voltage difference, and the processing unit obtains the temperature of the first diode chip based on the first voltage difference.

In a possible implementation, the first temperature sensor further includes a first anode, and the first circuit board is electrically connected to the first anode. The first circuit board obtains a second voltage difference between the first anode and the first cathode, and obtains the temperature of the first power semiconductor chip based on the second voltage difference.

The first anode, the first cathode, and the first output electrode are electrically connected to the first circuit board. Electrical information corresponding to the first power semiconductor chip and the first diode chip is directly detected, to obtain temperatures of the first power semiconductor chip and the first diode chip. This can implement accurate and quick measurement effect. In addition, temperatures respectively corresponding to the first power semiconductor chip and the first diode chip may be detected at the same time. This helps ensure safe running of the power module. In addition, this implementation has high compatibility, and is applicable to a plurality of types of circuits. For example, this implementation is compatible with three mainstream topologies: a vertical bridge topology, a horizontal bridge topology, and a boost topology.

In a possible implementation, the first power semiconductor chip further includes a first input electrode, and the first input electrode is electrically connected to the anode of the first diode chip. The reverse recovery current of the first diode chip flows from the anode of the first diode chip into the first power semiconductor chip through the first input electrode.

In an implementation, the cathode of the first diode chip is electrically connected to the first output electrode. The reverse recovery current of the first diode chip flows from the anode of the first diode chip, passes through an external loop, and then flows into the first power semiconductor chip through the first input electrode.

In a possible implementation, the first power semiconductor chip further includes a first input electrode. The first input electrode is electrically connected to the anode of the first diode chip, and the power module further includes a second diode chip and a third diode chip. A cathode of the second diode chip is electrically connected to the first input electrode. When the first power semiconductor chip is turned off, the second diode chip is configured to protect the first power semiconductor chip. A cathode of the third diode chip is electrically connected to the cathode of the first diode chip, and the third diode chip is configured to prevent the first diode chip from being broken down by an overvoltage.

In a possible implementation, there is at least one of a via hole, a connection line, and a connection metal layer between the first output electrode and the first cathode.

In a possible implementation, the power module further includes a second circuit board, a first output pin, and a first cathode pin. The first power semiconductor chip and the first diode chip are mounted on the second circuit board, and the first output pin and the first cathode pin are mounted on an edge of the second circuit board. The first output pin is connected between the first output electrode and the first circuit board, the first cathode pin is connected between the first cathode and the first circuit board, and the first circuit board obtains the first voltage difference by using the first output pin and the first cathode pin. A normalized pin-out manner reduces design and process costs.

In an implementation, the power module further includes a first anode pin. The first anode pin is mounted on the edge of the second circuit board, and the first anode pin is connected between the first anode and the first circuit board. The first circuit board obtains a second voltage difference between the first anode pin and the first cathode pin, to obtain the temperature of the first power semiconductor chip.

In a possible implementation, the first power semiconductor chip further includes a first input electrode, and the first input electrode is electrically connected to the anode of the first diode chip. The power module further includes a second power semiconductor chip, a second diode chip, and a second temperature sensor. The second power semiconductor chip includes a second output electrode, and the second output electrode is electrically connected to the first input electrode. The second temperature sensor is located inside the second power semiconductor chip, and is configured to detect a temperature of the second power semiconductor chip. The second temperature sensor includes a second cathode, and the second cathode is electrically connected to the second output electrode. A cathode of the second diode chip is electrically connected to the second output electrode, and the cathode of the second diode chip is electrically connected to the first input electrode. When the second diode chip generates a reverse recovery current, a voltage is generated between the second output electrode and the second cathode. The first circuit board is further electrically connected to the second output electrode and the second cathode. The first circuit board is configured to obtain a voltage difference between the second output electrode and the second cathode, and obtain a temperature of the second diode chip based on the voltage difference between the second output electrode and the second cathode.

The second power semiconductor chip is connected in series to the first power semiconductor chip, the second power semiconductor chip is connected to the first diode chip in anti-parallel, and the first diode chip is configured to protect the second power semiconductor chip. When the second power semiconductor chip is turned off, a current in a loop suddenly changes. To protect the second power semiconductor chip and the circuit, the current in the second power semiconductor chip is released to the first diode chip, and a loop current is formed on the first diode chip, to consume the current and implement safe energy transfer. A direction of the loop current formed on the first diode chip is from the anode of the first diode chip to the cathode of the second diode chip, and then a reverse recovery current is formed on the first diode chip.

A second gate is disposed on the second power semiconductor chip, and is configured to control turn-on and turn-off of the second power semiconductor chip. The second power semiconductor chip may be an IGBT, an MOSFET, or another power semiconductor chip. In an implementation, both the second power semiconductor chip and the first power semiconductor chip are IGBT chips. In an implementation, both the second power semiconductor chip and the first power semiconductor chip are MOSFET chips. In an implementation, one of the second power semiconductor chip and the first power semiconductor chip is an MOSFET chip, and the other is an IGBT chip.

An outer surface of the second temperature sensor is electrically insulated from an outer surface of the second power semiconductor chip, and the second cathode is electrically connected to the second output electrode through a connection cable, to implement an electrical connection between the second temperature sensor and the second power semiconductor chip. In an implementation, the second temperature sensor is a diode temperature sensor. In an implementation, the second temperature sensor is located in a main area in which the second power semiconductor chip generates a junction temperature. In an implementation, the second temperature sensor further includes a second anode, and the first circuit board is electrically connected to the second anode. The first circuit board obtains a voltage difference between the second anode and the second cathode, and obtains the temperature of the second power semiconductor chip based on the voltage difference.

The second diode chip is connected to the first power semiconductor chip in anti-parallel, and the second diode chip is configured to protect the first power semiconductor chip. When the first power semiconductor chip is turned off, a current in the first power semiconductor chip is released to the second diode chip to generate a loop current in the second diode chip. Then, a reverse recovery current is formed. The reverse recovery current of the second diode chip flows into the second power semiconductor chip through an external loop, and parasitic inductance exists between the second output electrode and the second cathode. A change rate of the reverse recovery current may generate an induced voltage on the second output electrode and the second cathode.

In an implementation, the first circuit board is electrically connected to the second output electrode and the second cathode, and the first circuit board obtains a voltage difference between the second output electrode and the second cathode, and obtains the temperature of the second diode chip based on the voltage difference.

In an implementation, the power module further includes a second output pin and a second cathode pin. The second output pin and the second cathode pin are mounted on an edge of the second circuit board. The second output pin is connected between the second output electrode and the first circuit board, and the second cathode pin is connected between the second cathode and the first circuit board. The first circuit board obtains a voltage difference between the second output pin and the second cathode pin, to obtain the temperature of the second diode chip.

In an implementation, there is at least one of a via hole, a connection line, and a connection metal layer between the second output electrode and the second cathode. Because there is the via hole, the connection line, or the connection metal layer that has a connection function between the second output electrode and the second cathode, when parasitic inductance exists in the second power semiconductor chip, a parasitic voltage is generated between the second output electrode and the second cathode.

In an implementation, the power module further includes a second anode pin. The second anode pin is mounted on the edge of the second circuit board, and the second anode pin is connected between the second anode and the first circuit board. The first circuit board obtains a voltage difference between the second anode pin and the second cathode pin, to obtain the temperature of the second power semiconductor chip.

In an implementation, the second power semiconductor chip further includes a second input electrode, and the second input electrode is electrically connected to the cathode of the first diode chip.

In a possible implementation, the power module further includes a third power semiconductor chip, a third diode chip, and a third temperature sensor. The third power semiconductor chip includes a third output electrode, and the third output electrode is electrically connected to the first input electrode and the second output electrode. The third temperature sensor is located inside the third power semiconductor chip, and is configured to detect a temperature of the third power semiconductor chip. The third temperature sensor includes a third cathode, and the third cathode is electrically connected to the second output electrode. An anode of the third diode chip is electrically connected to the third output electrode, and when the third diode chip generates a reverse recovery current, a voltage is generated between the third output electrode and the third cathode. The first circuit board is further electrically connected to the third output electrode and the third cathode. In an implementation, the first circuit board is configured to obtain a voltage difference between the third output electrode and the third cathode, and obtain a temperature of the third diode chip based on the voltage difference between the third output electrode and the third cathode.

A third gate is disposed on the third power semiconductor chip, and is configured to control turn-on and turn-off of the third power semiconductor chip. The third power semiconductor chip further includes a third input electrode, the third power semiconductor chip is connected to the third diode chip in anti-parallel, a cathode of the third diode chip is connected to the third input electrode, and the anode of the third diode chip is connected to the third output electrode.

The third diode chip is configured to protect the third power semiconductor chip. When the third power semiconductor chip is turned off, a current in a loop suddenly changes. A current in the third power semiconductor chip is released to the third diode chip, and a loop current is formed on the third diode chip to consume the current and implement safe energy transfer. Then, a reverse recovery current is formed on the third diode chip. After passing through an external loop, the reverse recovery current flows into the third power semiconductor chip through the third input electrode. In an implementation, the first circuit board is electrically connected to the third output electrode and the third cathode, and the first circuit board obtains a voltage difference between the third output electrode and the third cathode, and obtains the temperature of the third diode chip based on the voltage difference.

An outer surface of the third temperature sensor is electrically insulated from an outer surface of the third power semiconductor chip, and the third cathode is electrically connected to the third output electrode through a connection cable, to implement an electrical connection between the third temperature sensor and the third power semiconductor chip. In an implementation, the third temperature sensor is a diode temperature sensor. In an implementation, the third temperature sensor is located in a main area in which the third power semiconductor chip generates a junction temperature. In an implementation, the third temperature sensor further includes a third anode, and the first circuit board is electrically connected to the third anode. The first circuit board obtains a voltage difference between the third anode and the third cathode, and obtains the temperature of the third power semiconductor chip based on the voltage difference.

In an implementation, the power module further includes a third output pin, a third cathode pin, and a third anode pin. The third output pin, the third cathode pin, and the third anode pin are mounted on the edge of the second circuit board. The third output pin is connected between the third output electrode and the first circuit board, the third cathode pin is connected between the third cathode and the first circuit board, and the third anode pin is connected between the third anode and the first circuit board. The first circuit board obtains a voltage difference between the third output pin and the third cathode pin, to obtain the temperature of the third diode chip. The first circuit board obtains a voltage difference between the third anode pin and the third cathode pin, to obtain the temperature of the third power semiconductor chip.

In a possible implementation, the third power semiconductor chip further includes a third input electrode. The power module further includes a fourth power semiconductor chip, a fourth diode chip, and a fourth temperature sensor. The fourth power semiconductor chip includes a fourth output electrode and a fourth input electrode, and the fourth input electrode is electrically connected to the third input electrode. The fourth temperature sensor is located inside the fourth power semiconductor chip, and is configured to detect a temperature of the fourth power semiconductor chip. The fourth temperature sensor includes a fourth cathode, and the fourth cathode is electrically connected to the fourth output electrode. An anode of the fourth diode chip is electrically connected to the fourth output electrode, and when the fourth diode chip generates a reverse recovery current, a voltage is generated between the fourth output electrode and the fourth cathode. The first circuit board is further electrically connected to the fourth output electrode and the fourth cathode. In an implementation, the first circuit board is configured to obtain a voltage difference between the fourth output electrode and the fourth cathode, and obtain a temperature of the fourth diode chip based on the voltage difference between the fourth output electrode and the fourth cathode.

A fourth gate is disposed on the fourth power semiconductor chip, and is configured to control turn-on and turn-off of the fourth power semiconductor chip. The fourth power semiconductor chip further includes the fourth input electrode, the fourth power semiconductor chip is connected to the fourth diode chip in anti-parallel, a cathode of the fourth diode chip is connected to the fourth input electrode, and the anode of the fourth diode chip is connected to the fourth output electrode.

The fourth diode chip is configured to protect the fourth power semiconductor chip. When the fourth power semiconductor chip is turned off, a current in a loop suddenly changes. A current in the fourth power semiconductor chip is released to the fourth diode chip, and a loop current is formed on the fourth diode chip to consume the current and implement safe energy transfer. Then, a reverse recovery current is formed on the fourth diode chip. After passing through the external loop, the reverse recovery current flows into the fourth power semiconductor chip through the fourth input electrode. In an implementation, the first circuit board is electrically connected to the fourth output electrode and the fourth cathode. The first circuit board obtains a voltage difference between the fourth output electrode and the fourth cathode, and obtains the temperature of the fourth diode chip based on the voltage difference.

An outer surface of the fourth temperature sensor is electrically insulated from an outer surface of the fourth power semiconductor chip, and the fourth cathode is electrically connected to the fourth output electrode through a connection cable, to implement an electrical connection between the fourth temperature sensor and the fourth power semiconductor chip. In an implementation, the fourth temperature sensor is a diode temperature sensor. In an implementation, the fourth temperature sensor is located in a main area in which the fourth power semiconductor chip generates a junction temperature. In an implementation, the fourth temperature sensor further includes a fourth anode, and the first circuit board is electrically connected to the fourth anode. The first circuit board obtains a voltage difference between the fourth anode and the fourth cathode, and obtains the temperature of the fourth power semiconductor chip based on the voltage difference.

In an implementation, the power module further includes a fourth output pin, a fourth cathode pin, and a fourth anode pin. The fourth output pin, the fourth cathode pin, and the fourth anode pin are mounted on the edge of the second circuit board. The fourth output pin is connected between the fourth output electrode and the first circuit board, the fourth cathode pin is connected between the fourth cathode and the first circuit board, and the fourth anode pin is connected between the fourth anode and the first circuit board. The first circuit board obtains a voltage difference between the fourth output pin and the fourth cathode pin, to obtain the temperature of the fourth diode chip. The first circuit board obtains a voltage difference between the fourth anode pin and the fourth cathode pin, to obtain the temperature of the fourth power semiconductor chip.

In a possible implementation, the first power semiconductor chip further includes a first input electrode. The cathode of the first diode chip is connected to the first input electrode. The power module further includes a second power semiconductor chip, a second diode chip, and a second temperature sensor. The second power semiconductor chip includes a second output electrode and a second input electrode, and the second input electrode is electrically connected to the first input electrode. The second temperature sensor is located inside the second power semiconductor chip, and is configured to detect a temperature of the second power semiconductor chip. The second temperature sensor includes a second cathode, and the second cathode is electrically connected to the second output electrode. A cathode of the second diode chip is electrically connected to the second input electrode, and when the second diode chip generates a reverse recovery current, a voltage is generated between the second output electrode and the second cathode. The first circuit board is further electrically connected to the second output electrode and the second cathode. The first circuit board is configured to obtain a voltage difference between the second output electrode and the second cathode, and obtain a temperature of the second diode chip based on the voltage difference between the second output electrode and the second cathode.

The second power semiconductor chip is connected to the second diode chip in anti-parallel. The second diode chip is configured to protect the second power semiconductor chip. When the second power semiconductor chip is turned off, a current in a loop suddenly changes. A current in the second power semiconductor chip is released to the second diode chip, and a loop current is formed on the second diode chip. Then, a reverse recovery current is formed on the second diode chip. After passing through the external loop, the reverse recovery current flows into the second power semiconductor chip through the second input electrode. In an implementation, the first circuit board is electrically connected to the second output electrode and the second cathode, and the first circuit board obtains a voltage difference between the second output electrode and the second cathode, and obtains the temperature of the second diode chip based on the voltage difference.

The first diode chip is connected to the first power semiconductor chip in anti-parallel. The cathode of the first diode chip is connected to the first input electrode, and the anode of the first diode chip is connected to the first output electrode. The first diode chip is configured to protect the first power semiconductor chip, and when the first power semiconductor chip is turned off, a current in the first power semiconductor chip is released to the first diode chip, and a loop current is formed on the first diode chip to consume the current and implement safe energy transfer. Then, a reverse recovery current is formed on the first diode chip. After passing through an external loop, the reverse recovery current flows into the first power semiconductor chip through the first input electrode. The temperature of the first diode chip is obtained by measuring a voltage difference between the first output electrode and the first cathode.

In an implementation, the power module further includes a second output pin and a second cathode pin. The second output pin and the second cathode pin are mounted on the edge of the second circuit board. The second output pin is connected between the second output electrode and the first circuit board, and the second cathode pin is connected between the second cathode and the first circuit board. The first circuit board obtains a voltage difference between the second output pin and the second cathode pin, to obtain the temperature of the second diode chip.

In an implementation, the power module further includes a second anode pin. The second anode pin is mounted on the edge of the second circuit board, and the second anode pin is connected between the second anode and the first circuit board. The first circuit board obtains a voltage difference between the second anode pin and the second cathode pin, to obtain the temperature of the second power semiconductor chip.

In a possible implementation, the anode of the first diode chip is connected to the first output electrode. The power module further includes a second power semiconductor chip, a second diode chip, and a second temperature sensor. The second power semiconductor chip includes a second output electrode, and the second output electrode is electrically connected to the first output electrode. The second temperature sensor is located inside the second power semiconductor chip, and is configured to detect a temperature of the second power semiconductor chip. The second temperature sensor includes a second cathode, and the second cathode is electrically connected to the second output electrode. An anode of the second diode chip is electrically connected to the second output electrode. When the second diode chip generates a reverse recovery current, a voltage is generated between the second output electrode and the second cathode. The first circuit board is further electrically connected to the second output electrode and the second cathode. The first circuit board is configured to obtain a voltage difference between the second output electrode and the second cathode, and obtain the temperature of the second diode chip based on the voltage difference between the second output electrode and the second cathode.

According to a second aspect, this application provides a power supply system. The power supply system includes a power supply, a power-consuming device, and the power module according to any one of the foregoing implementations. The power supply is connected to an input end of the power module, and the power-consuming device is connected to an output end of the power module.

According to a third aspect, this application provides a vehicle. The vehicle includes a vehicle body and the foregoing power supply system, and the power supply system is mounted on the vehicle body.

According to a fourth aspect, this application provides a photovoltaic system. The photovoltaic system includes a photovoltaic module and the power module according to any one of the foregoing implementations, the photovoltaic module is electrically connected to the power module, and a direct current generated by the photovoltaic module is converted into an alternating current by using the power module.

In this application, electrical information corresponding to a power semiconductor chip and a diode chip can be directly detected by disposing a temperature sensor and a pin of a power semiconductor chip. Temperatures of the power semiconductor chip and the diode chip may be obtained, to achieve accurate and quick measurement effect. In addition, in this application, temperatures corresponding to the power semiconductor chip and the diode chip may be simultaneously detected, to ensure secure running of the power module.

BRIEF DESCRIPTION OF DRAWINGS

To describe technical solutions in embodiments of this application more clearly, the following describes accompanying drawings used in embodiments of this application.

DESCRIPTION OF EMBODIMENTS

The following describes technical solutions in embodiments of this application with reference to accompanying drawings in embodiments of this application. It is clear that the described embodiments are merely some rather than all of embodiments of this application.

Terms “first”, “second”, and the like in this specification are merely intended for a purpose of description, and shall not be understood as an indication or implication of relative importance or implicit indication of a quantity of indicated technical features. Therefore, a feature limited by “first” or “second” may explicitly or implicitly include one or more features. In the descriptions of this application, unless otherwise stated, “a plurality of” means two or more than two.

In addition, in this specification, orientation terms such as “above” and “below” are defined relative to orientations of schematically disposed structures in the accompanying drawings. It should be understood that these directional terms are relative concepts and are used for relative description and clarification, and may vary accordingly with changes of the orientations of the structures.

For ease of understanding, the following first explains and describes abbreviations and related technical terms in embodiments of this application.

An IGBT is an abbreviation for an insulated gate bipolar transistor.

An FRD is an abbreviation for a fast recovery diode.

A MOSFET is an abbreviation for a metal-oxide-semiconductor field-effect transistor, means a metal-oxide semiconductor field-effect transistor, and is also referred to as a MOS transistor.

A pin means a wiring from an internal circuit of an integrated circuit (chip) to a peripheral circuit. All pins form an interface of the chip.

Figure 1:
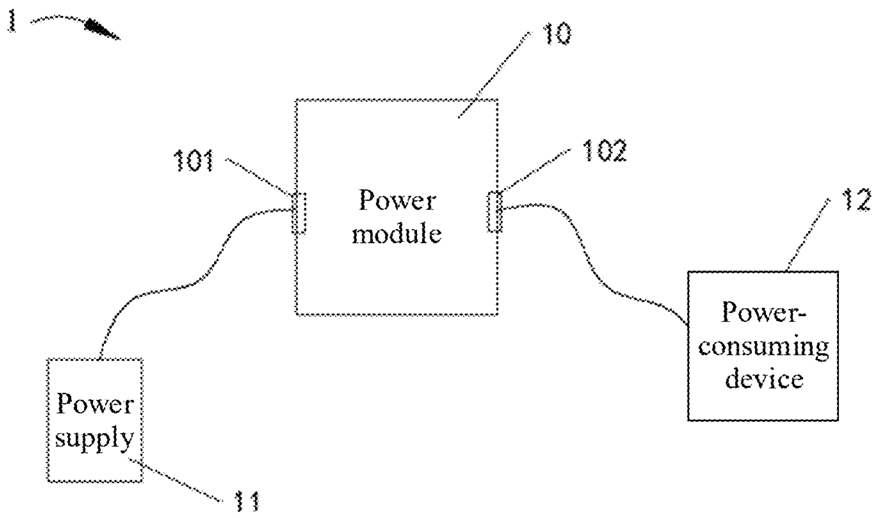
FIG. 1 is a diagram of a power supply system according to an implementation of this application.

Refer to FIG. 1. An implementation of this application provides a power supply system 1. The power supply system 1 includes a power supply 11, a power-consuming device 12, and a power module 10. The power supply 11 is connected to an input end 101 of the power module 10, and the power-consuming device 12 is connected to an output end 102 of the power module 10. The power module 10 is a semiconductor apparatus that converts a voltage, a current, a cycle quantity, and the like of the power supply 11, and is a core apparatus for performing power conversion on a power supply circuit. For example, the power supply system 1 may be used as a core apparatus for converting a direct current into an alternating current by a motor control unit of an electric vehicle, and used as a battery of the electric vehicle to output a direct current, or convert a direct current into an alternating current required for running the vehicle, or the like. The power module 10 may also be referred to as a power device. In an implementation, the power module 10 may be formed after a power electronic device is combined and encapsulated according to a specific function. Different power modules 10 play different functions in different circuit systems, for example, functions such as voltage conversion, inverter, rectification, and frequency conversion.

For example, a current input into the power module 10 may be a high-voltage direct current, and the high-voltage direct current is converted into a low-voltage direct current by the power module 10. The power module may implement conversion from the high-voltage direct current to the low-voltage direct current, to supply power to the power-consuming device 12.

For example, a low-voltage direct current generated by a photovoltaic panel is converted into a 220 V alternating current after being inverted by the power module 10, and the 220 V alternating current may supply power to a household appliance.

In an implementation, to prevent physical damage and chemical corrosion of the power module 10 in a use process, the power module 10 is packaged. Common packaging manners include housing packaging, molding packaging, SOP packaging, and the like. After being packaged, the power module 10 provides a pin for external connection, so that the power module 10 can perform electrical connection more conveniently.

Figure 2:
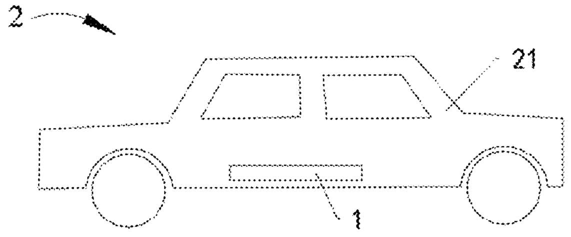
FIG. 2 is a diagram of a vehicle according to an implementation of this application.

Refer to FIG. 2. The power supply system 1 in this application may be used in a vehicle 2. The vehicle 2 includes a vehicle body 21 and the power supply system 1 described above, and the power supply system 1 is mounted on the vehicle body 21. The power supply system 1 provides a power source for the vehicle 2. The power supply system 1 in this application has high power density, and can be used in the vehicle 2 to improve power performance of the vehicle 2. The vehicle 2 includes a car (as shown in FIG. 2). In another implementation, the vehicle 2 includes an electric vehicle or a special operation vehicle. The electric vehicle includes a two-wheeled, three-wheeled, or four-wheeled electric vehicle. The special operation vehicle includes various vehicles having specific functions, for example, an engineering rescue vehicle, a sprinkler, a sewage suction truck, a cement mixer truck, a crane, and a medical vehicle. In this implementation, the power supply 11 is a battery in the vehicle 2, and the power-consuming device 12 is a motor in the vehicle 2. In some implementations, the power supply system 1 includes an inverter (not shown in the figure), the power module 10 and a control circuit (not shown in the figure) are disposed in the inverter, and the control circuit is electrically connected to the power module 10. The control circuit may control, based on a requirement of the vehicle 2, performance parameters such as a voltage, a current, a cycle quantity, and a frequency of an alternating current output by the power module 10 to the motor.

Figure 3:
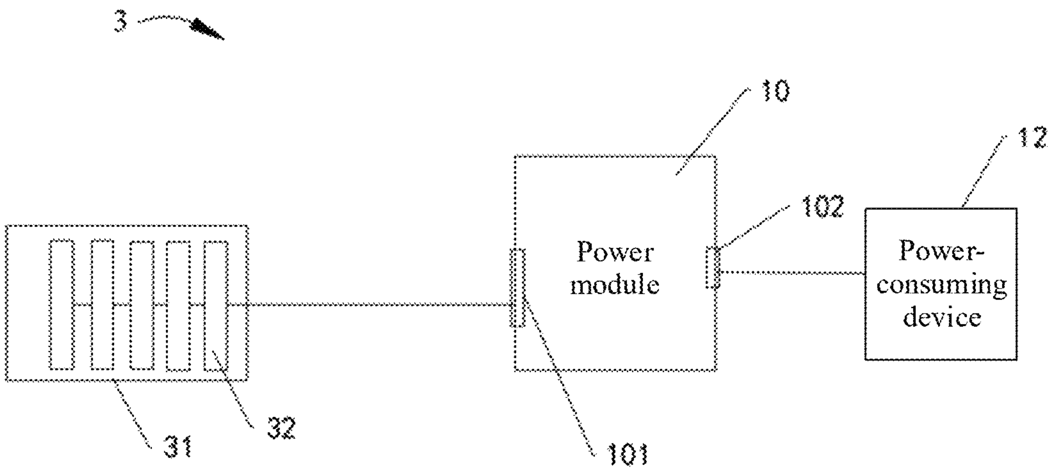
FIG. 3 is a diagram of a photovoltaic system according to an implementation of this application.

Refer to FIG. 3. The power module 10 in this application may be further used in a photovoltaic system 3. The photovoltaic system 3 includes a photovoltaic module 31 and the power module 10. The photovoltaic module 31 is electrically connected to the power module 10. A direct current generated by the photovoltaic module 31 is converted into an alternating current by using the power module 10. The alternating current output by the power module 10 is transmitted to a power-consuming device, for example, a base station or a data center.

The photovoltaic module 31 includes at least one photovoltaic panel 32, and the photovoltaic panel 32 is connected to the power module 10. In an implementation, the photovoltaic module 31 includes a plurality of serially connected photovoltaic panels 32. Direct currents of the plurality of photovoltaic panels 32 are converged in a serial connection manner, and the photovoltaic panels 32 are connected to the power module 10 by using a connector. In some implementations, the photovoltaic system 3 includes an inverter (not shown in the figure), the power module 10 and a control circuit (not shown in the figure) are disposed in the inverter, and the control circuit is electrically connected to the power module 10. The control circuit may control, based on a requirement of the power-consuming device, performance parameters such as a voltage, a current, a cycle quantity, and a frequency of an alternating current output by the power module 10.

In a working process, the power module 10 inevitably generates heat. Especially when the power module 10 is lighter and miniaturized, current density of the power module 10 increases. As a result, high heat is generated inside the power module 10, and a junction temperature increases. In an implementation, to prevent physical damage and chemical corrosion of the power module 10 in a use process, the power module 10 is packaged. Common packaging manners include housing packaging, molding packaging, SOP packaging, and the like. Heat that is caused by loss and that is generated by the power module 10 during operation is more difficult to be discharged in a highly integrated package. If heat generated by the power module 10 cannot be discharged in time, a high junction temperature affects overall thermomechanical performance and reliability of the power module 10, causing the power module 10 to be burnt or broken down, and causing a failure of the power module 10. In addition, overheating increases power consumption of the power module 10, and is expected to reduce transmission performance of the power module 10. Therefore, when the power module 10 runs, a temperature of the power module 10 needs to be detected in real time to improve running reliability of the power module 10.

The power module 10 usually includes a power semiconductor chip and a diode chip. If the power semiconductor chip and the diode chip generate heat or are burnt or broken down, energy efficiency of the power module 10 is affected. In the conventional technology, generally, a thermistor is used to monitor temperatures of the power semiconductor chip and the diode chip. If two thermistors are disposed to monitor the temperatures of the power semiconductor chip and the diode chip respectively, because the thermistor is usually at a specific distance from the power semiconductor chip or the diode chip, compared with an actual temperature, detected temperature information has a specific error and delay. In addition, when a temperature sensor is used to correct the thermistor, a through hole needs to be dug under the power semiconductor chip and the diode chip, and the temperature sensor is attached and disposed under the power semiconductor chip and the diode chip. This method makes a structure of the power module 10 more complex, has a higher requirement on a processing process, and increases design and manufacturing costs. In addition, although detection results of the thermistor and the temperature sensor are obtained by measuring a same object, precision and measurement bandwidth of the thermistor and sensor are not consistent, and an algorithm needs to be used for optimization during correction. This increases difficulty of data processing. If only one thermistor is disposed to monitor the temperatures of the power semiconductor chip and the diode chip, a temperature detected by the thermistor is coupling information of the temperatures of the power semiconductor chip and the diode chip, and cannot accurately and separately reflect the temperature of the power semiconductor chip and the temperature of the diode chip. In addition, in the conventional technology, a temperature measurement method for the power semiconductor chip and the diode chip has a narrow application range, and cannot be applied to a plurality of circuits.

Embodiment 1

Figure 4:
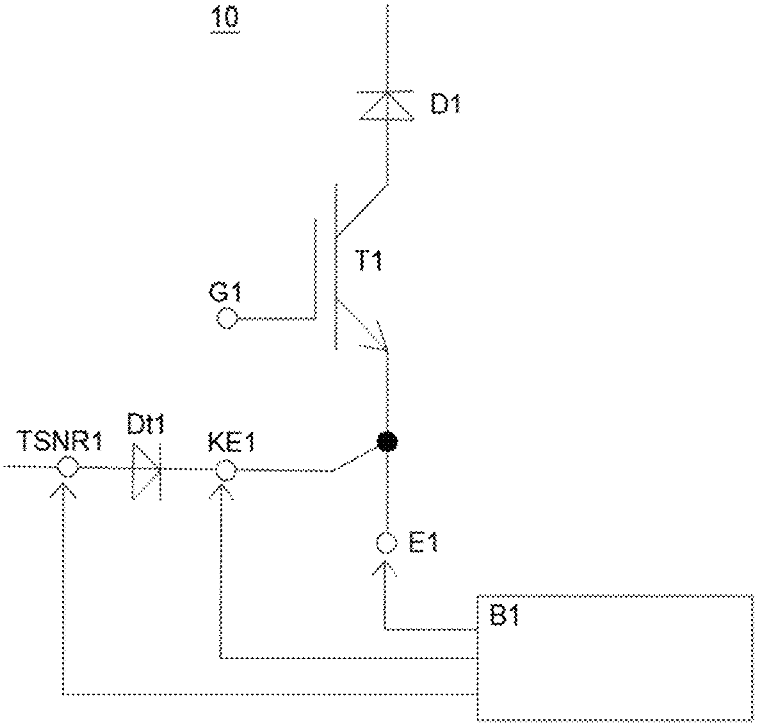
FIG. 4 is a diagram of a power module according to Embodiment 1 of this application.

Refer to FIG. 4. Embodiment 1 of this application provides a power module 10. The power module 10 includes a first power semiconductor chip T1, a first temperature sensor Dt1, a first diode chip D1, and a first circuit board B1. The first power semiconductor chip T1 includes a first output electrode E1. The first temperature sensor Dt1 is located inside the first power semiconductor chip, and is configured to detect a temperature T1 of the first power semiconductor chip. The first temperature sensor Dt1 includes a first cathode KE1, and the first cathode KE1 is electrically connected to the first output electrode E1. The first diode chip D1 is electrically connected to the first power semiconductor chip T1, and when the first diode chip D1 generates a reverse recovery current, an induced voltage is generated between the first output electrode E1 on the first power semiconductor chip T1 and the first cathode KE1. The first circuit board B1 is electrically connected to the first output electrode E1 and the first cathode KE1. The first circuit board B1 obtains a first voltage difference VEKE between the first output electrode E1 and the first cathode KE1, and obtains a temperature of the first diode chip D1 based on the first voltage difference VEKE.

A first gate G1 is disposed on the first power semiconductor chip T1, and is configured to control turn-on and turn-off of the first power semiconductor chip T1. The first power semiconductor chip T1 may be an IGBT, an MOSFET, or another power semiconductor chip. In an implementation, the first power semiconductor chip T1 is an IGBT chip, and the first output electrode E1 is an emitter of the IGBT chip. In an implementation, the first power semiconductor chip T1 is an MOSFET chip, and the first output electrode E1 is a source of the MOSFET chip.

An outer surface of the first temperature sensor Dt1 is electrically insulated from an outer surface of the first power semiconductor chip T1, and the first cathode KE1 is electrically connected to the first output electrode E1 through a connection cable, to implement an electrical connection between the first temperature sensor Dt1 and the first power semiconductor chip T1. In an implementation, the first temperature sensor Dt1 is a diode temperature sensor. Compared with a thermistor, the diode temperature sensor measures a temperature of a power semiconductor chip more accurately. Resistance of the diode temperature sensor is not affected by the temperature, so that the diode temperature sensor measures the temperature of the diode chip more accurately. In an implementation, the first temperature sensor Dt1 is located in a main area in which the first power semiconductor chip T1 generates a junction temperature. If the first temperature sensor Dt1 is closer to a main area in which the IGBT chip generates a junction temperature, temperature that is of the IGBT chip and that is detected by the first temperature sensor Dt1 is more accurate.

Figure 5:
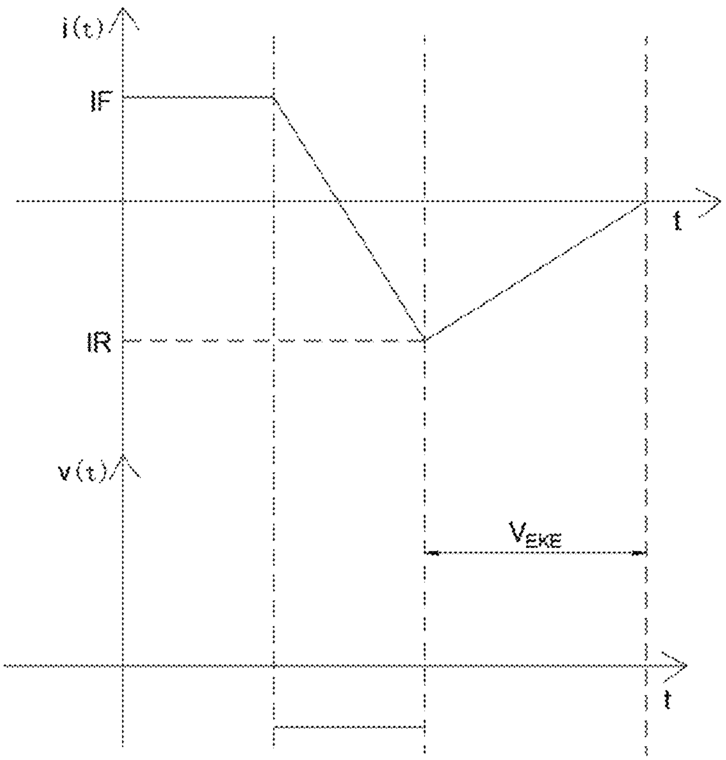
FIG. 5 is a diagram of a current recovery process in a direction of a diode chip according to an implementation of this application.

The first diode chip D1 may be configured to protect a circuit. In an implementation, the first diode chip D1 may be an FRD chip. In another implementation, the first diode chip D1 may alternatively be another diode chip. When the first diode chip D1 is forward turned on, a current flows from an anode of the first diode chip D1 to a cathode of the first diode chip D1. When the current input to the first diode chip D1 gradually decreases to zero, there is a reverse recovery process when the current on the first diode chip D1 changes from forward turning on to cutoff. The current on the first diode chip D1 does not immediately change to zero, but changes from a forward current IF to a large reverse current IR (as shown in FIG. 5). In this case, the current flows from the cathode of the first diode chip D1 to the anode of the first diode chip D1, and the reverse current IR gradually decreases to zero or approaches to zero. In this case, the first diode chip D1 enters an off state, a current that changes from the IR to zero is referred to as a reverse recovery current. The reverse recovery current of the first diode chip D1 flows into the first power semiconductor chip T1. A change rate of the reverse recovery current is affected by a junction temperature of the first diode chip D1, and decreases as the junction temperature increases. In other words, a smaller change rate of the reverse recovery current indicates a higher temperature of the first diode chip D1. Correspondingly, parasitic inductance caused by a package structure exists between the first output electrode E1 and the first cathode KE1. The change rate of the reverse recovery current may generate an induced voltage, that is, the first voltage difference VEKE, on the first output electrode E1 and the first cathode KE1.

A data collection unit and a processing unit are disposed on the first circuit board B1. The data collection unit obtains the first voltage difference VEKE, and the processing unit obtains the temperature of the first diode chip D1 based on the first voltage difference VEKE.

In a possible implementation, the first temperature sensor Dt1 further includes a first anode TSNR1, and the first circuit board B1 is electrically connected to the first anode TSNR1. The first circuit board B1 obtains a second voltage difference VAK between the first anode TSNR1 and the first cathode KE1, and obtains a temperature of the first power semiconductor chip T1 based on the second voltage difference VAK.

In this implementation, the first anode TSNR1, the first cathode KE1, and the first output electrode E1 are electrically connected to the first circuit board B1. Electrical information corresponding to the first power semiconductor chip T1 and the first diode chip D1 is directly detected, to obtain temperatures of the first power semiconductor chip T1 and the first diode chip D1. This can implement accurate and quick measurement effect. In addition, temperatures corresponding to the first power semiconductor chip T1 and the first diode chip D1 can be detected at the same time. This helps ensure safe running of the power module 10. In addition, this implementation has high compatibility, and is applicable to a plurality of types of circuits. For example, this implementation is compatible with three mainstream topologies: a vertical bridge topology, a horizontal bridge topology, and a boost topology.

Figure 6:
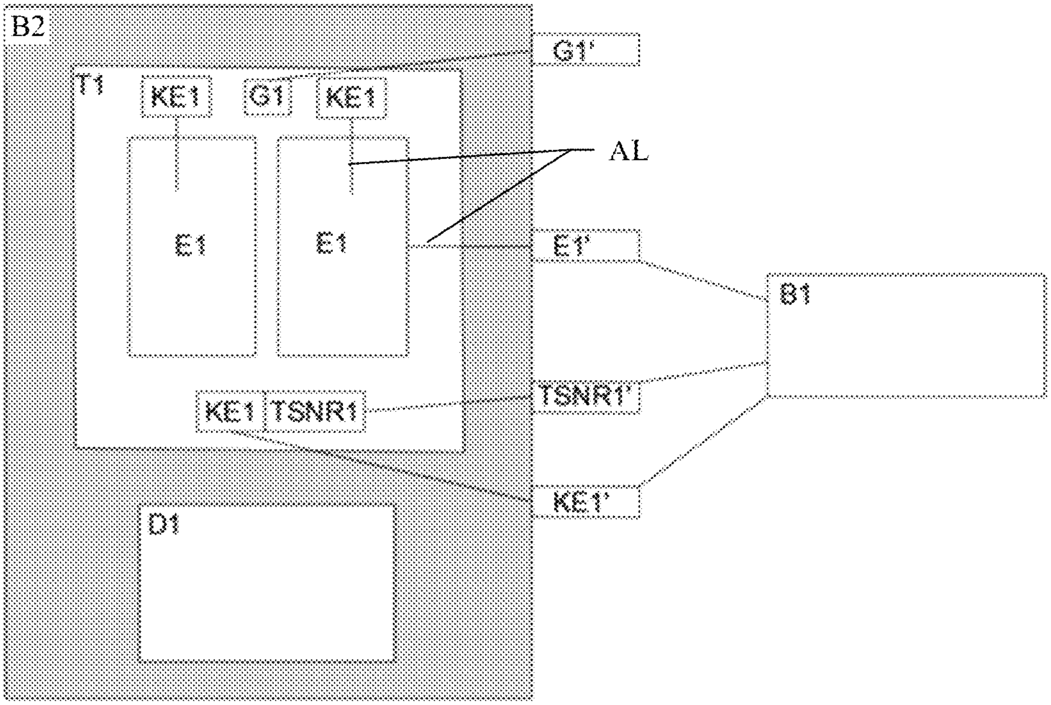
FIG. 6 is a diagram of a circuit board and a chip according to an implementation of this application.

Refer to FIG. 6. In a possible implementation, the power module 10 further includes a second circuit board B2, a first output pin E1', and a first cathode pin KE1'. The first power semiconductor chip T1 and the first diode chip D1 are mounted on the second circuit board B2, and the first output pin E1' and the first cathode pin KE1' are mounted on an edge of the second circuit board B2. The first output pin E1' is connected between the first output electrode E1 and the first circuit board B1, and the first cathode pin KE1' is connected between the first cathode KE1 and the first circuit board B1. The first circuit board B1 obtains a first voltage difference VEKE between the first output pin E1' and the first cathode pin KE1' to obtain the temperature of the first diode chip D1. A normalized pin-out manner reduces design and process costs.

In an implementation, the power module 10 further includes a first anode pin TSNR1', the first anode pin TSNR1' is mounted on an edge of the second circuit board B2, and the first anode pin TSNR1' is connected between the first anode TSNR1 and the first circuit board B1. The first circuit board B1 obtains a second voltage difference VAK between the first anode pin TSNR1' and the first cathode pin KE1', to obtain the temperature of the first power semiconductor chip T1.

In a possible implementation, there is at least one of a via hole, a connection line, and a connection metal layer between the first output electrode E1 and the first cathode KE1. The via hole is a via hole that passes through the first power semiconductor chip T1. The connection line is a metal wire on the outer surface of the first power semiconductor chip T1, for example, an aluminum (AL) wire (as shown in FIG. 6). The connection metal layer is a metal layer located in the first power semiconductor chip T1, and is used for connection. When parasitic inductance exists on the first power semiconductor chip T1, a parasitic inductance voltage is generated on these connected components. The via hole, the connection line, or the connection metal layer may be disposed between the first output electrode E1 and the first cathode KE1 as required.

In a possible implementation, the first power semiconductor chip T1 further includes a first input electrode, and the first input electrode is electrically connected to the anode of the first diode chip D1 (as shown in FIG. 4). The reverse recovery current of the first diode chip D1 flows from the anode of the first diode chip D1 into the first power semiconductor chip T1 through the first input electrode.

In an implementation, the cathode of the first diode chip D1 is electrically connected to the first output electrode E1. The reverse recovery current of the first diode chip D1 flows from the anode of the first diode chip D1, passes through an external loop, and then flows into the first power semiconductor chip T1 through the first input electrode.

Embodiment 2

Figure 7:
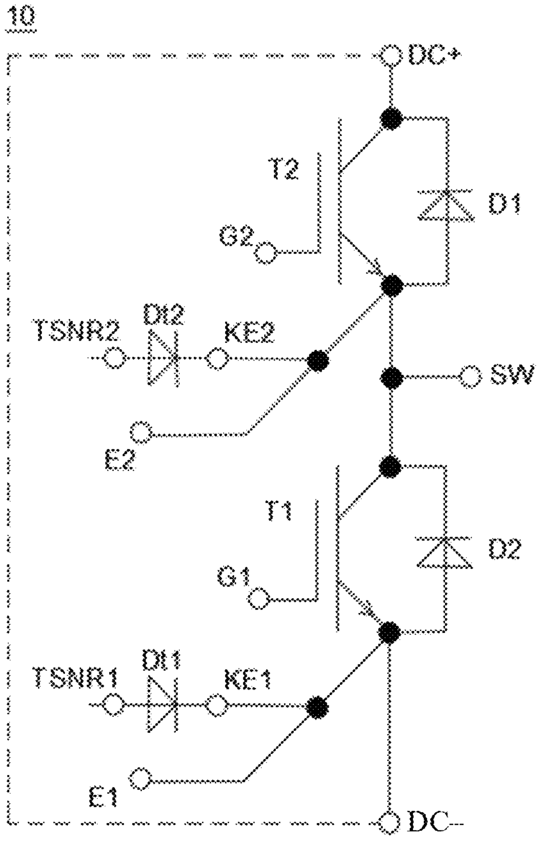
FIG. 7 is a diagram of a power module according to Embodiment 2 of this application.

Refer to FIG. 7. Embodiment 2 of this application provides a power module 10. A difference from Embodiment 1 lies in that the power module 10 further includes a second power semiconductor chip T2, a second diode chip D2, and a second temperature sensor Dt2. The second power semiconductor chip T2 includes a second output electrode E2, and the second output electrode E2 is electrically connected to a first input electrode. The second temperature sensor Dt2 is located inside the second power semiconductor chip T2, and is configured to detect a temperature of the second power semiconductor chip T2. The second temperature sensor Dt2 includes a second cathode KE2, and the second cathode KE2 is electrically connected to the second output electrode E2. A cathode of the second diode chip D2 is electrically connected to the second output electrode E2, and the cathode of the second diode chip D2 is electrically connected to the first input electrode. When the second diode chip D2 generates a reverse recovery current, a voltage is generated between the second output electrode E2 of the second power semiconductor chip T2 and the second cathode KE2.

A circuit in FIG. 7 is a vertical bridge topology circuit. The second power semiconductor chip T2 is connected in series to a first power semiconductor chip T1, and the second power semiconductor chip T2 is connected to a first diode chip D1 in anti-parallel. The first diode chip D1 is configured to protect the second power semiconductor chip T2. When the second power semiconductor chip T2 is turned off, a current in a loop suddenly changes. To protect the second power semiconductor chip T2 and the circuit, a current in the second power semiconductor chip T2 is released to the first diode chip D1, and a loop current is formed on the first diode chip D1, to consume the current and implement safe energy transfer. A direction of the loop current formed on the first diode chip D1 is from an anode of the first diode chip D1 to the cathode of the second diode chip D2, and then a reverse recovery current is formed on the first diode chip D1.

A second gate G2 is disposed on the second power semiconductor chip T2, and is configured to control turn-on and turn-off of the second power semiconductor chip T2. The second power semiconductor chip T2 may be an IGBT, an MOSFET, or another power semiconductor chip. In an implementation, both the second power semiconductor chip T2 and the first power semiconductor chip T1 are IGBT chips. In an implementation, both the second power semiconductor chip T2 and the first power semiconductor chip T1 are MOSFET chips. In an implementation, one of the second power semiconductor chip T2 and the first power semiconductor chip T1 is an MOSFET chip, and the other is an IGBT chip.

An outer surface of the second temperature sensor Dt2 is electrically insulated from an outer surface of the second power semiconductor chip T2, and the second cathode KE2 is electrically connected to the second output electrode E2 through a connection cable, to implement an electrical connection between the second temperature sensor Dt2 and the second power semiconductor chip T2. In an implementation, the second temperature sensor Dt2 is a diode temperature sensor. Compared with the thermistor, the diode temperature sensor measures the temperature of the power semiconductor chip more accurately. Resistance of the diode temperature sensor is not affected by the temperature, so that the diode temperature sensor measures the temperature of the diode chip more accurately. In an implementation, the second temperature sensor Dt2 is located in a main area in which the second power semiconductor chip T2 generates a junction temperature. In an implementation, the second temperature sensor Dt2 further includes a second anode TSNR2, and a first circuit board B1 is electrically connected to the second anode TSNR2. The first circuit board B1 obtains a voltage difference between the second anode TSNR2 and the second cathode KE2, and obtains the temperature of the second power semiconductor chip T2 based on the voltage difference.

The second diode chip D2 is connected to the first power semiconductor chip T1 in anti-parallel. The second diode chip D2 is configured to protect the first power semiconductor chip T1. When the first power semiconductor chip T1 is turned off, a current in a loop suddenly changes. To protect the first power semiconductor chip T1 and the circuit, a current in the first power semiconductor chip T1 is released to the second diode chip D2, and a loop current is formed on the second diode chip D2, to consume the current and implement safe energy transfer. A direction of the loop current formed on the second diode chip D2 is from an anode of the second diode chip D2 to the cathode of the second diode chip D2. When the loop current gradually decreases to zero, the current on the second diode chip D2 does not immediately change to zero, but changes from a forward current to a reverse current. In this case, the reverse current flows from the cathode of the second diode chip D2 to the anode of the second diode chip D2, and the reverse current gradually decreases to zero or approaches to zero. In this case, the second diode chip D2 enters an off state, and a reverse recovery current of the second diode chip D2 flows into the second power semiconductor chip T2 through an external loop. Parasitic inductance exists between the second output electrode E2 and the second cathode KE2, and a change rate of the reverse recovery current may generate an induced voltage on the second output electrode E2 and the second cathode KE2.

In an implementation, the first circuit board B1 is electrically connected to the second output electrode E2 and the second cathode KE2. The first circuit board B1 obtains a voltage difference between the second output electrode E2 and the second cathode KE2, and obtains a temperature of the second diode chip D2 based on the voltage difference.

In an implementation, the power module 10 further includes a second output pin E2' and a second cathode pin KE2'. The second output pin E2' and the second cathode pin KE2' are mounted on an edge of the second circuit board B2, the second output pin E2' is connected between the second output electrode E2 and the first circuit board B1, and the second cathode pin KE2' is connected between the second cathode KE2 and the first circuit board B1. The first circuit board B1 obtains a voltage difference between the second output pin E2' and the second cathode pin KE2', to obtain the temperature of the second diode chip D2.

In an implementation, there is at least one of a via hole, a connection line, and a connection metal layer between the second output electrode E2 and the second cathode KE2. Because there is the via hole, the connection line, or the connection metal layer that has a connection function between the second output electrode E2 and the second cathode KE2, when parasitic inductance exists in the second power semiconductor chip T2, a parasitic voltage is generated between the second output electrode E2 and the second cathode KE2.

In an implementation, the power module 10 further includes a second anode pin TSNR2'. The second anode pin TSNR2' is mounted on an edge of the second circuit board B2, and the second anode pin TSNR2' is connected between the second anode TSNR2 and the first circuit board B1. The first circuit board B1 obtains a voltage difference between the second anode pin TSNR2' and the second cathode pin KE2', to obtain a temperature of the second power semiconductor chip T2.

In an implementation, the second power semiconductor chip T2 further includes a second input electrode, and the second input electrode is electrically connected to a cathode of the first diode chip D1.

When the power module 10 is configured to convert a direct current into an alternating current, an SW port is formed between the first power semiconductor chip T1 and the second power semiconductor chip T2, the SW port is an output end of the power module 10, and the SW port is electrically connected to the second output electrode E2 and the first input electrode. The second input electrode is connected to a positive electrode DC+ of a direct current bus, and the first output electrode E1 is connected to a negative electrode DC− of the direct current bus. Direct currents are input to both the first power semiconductor chip T1 and the second power semiconductor chip T2. When the second power semiconductor chip T2 is turned on and the first power semiconductor chip T1 is turned off, the SW port outputs a voltage of "positive level". When the first power semiconductor chip T1 is turned on and the second power semiconductor chip T2 is turned off, the SW port outputs a voltage of "negative level". The direct current is converted into the alternating current by controlling the first power semiconductor chip T1 and the second power semiconductor chip T2 to be alternately turned on and off. In addition, in a process in which the first power semiconductor chip T1 and the second power semiconductor chip T2 are alternately turned on and off, temperatures of the first power semiconductor chip T1, the first diode chip D1, the second power semiconductor chip T2, and the second diode chip D2 are obtained by disposing a first anode pin TSNR1', a first cathode pin KE1', a first output pin E1', the second anode pin TSNR2', the second cathode pin KE2', and the second output pin E2'. This can achieve accurate and quick measurement effect, and help ensure safe running of the power module 10.

Embodiment 3

Figure 8:
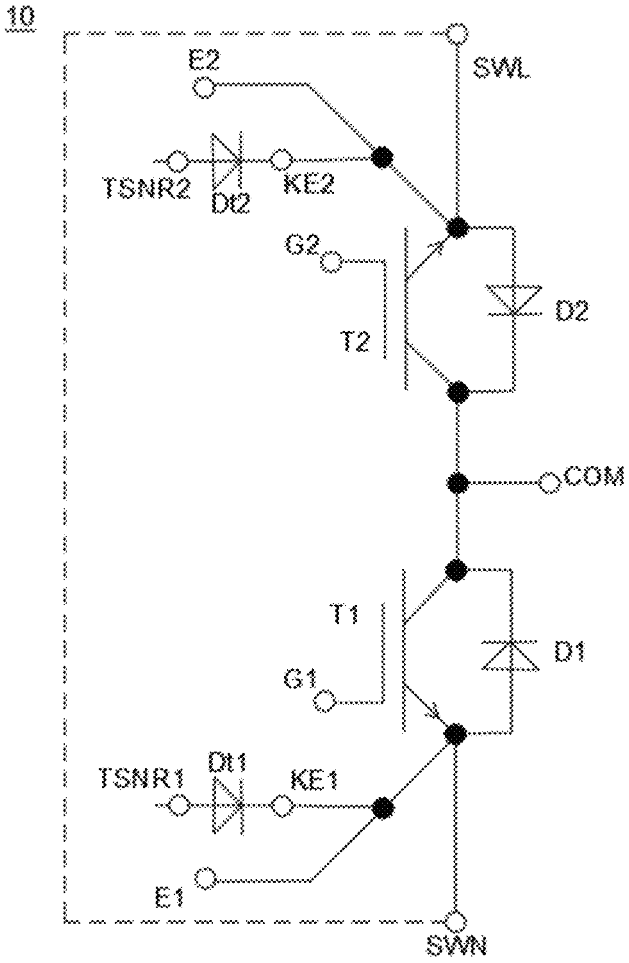
FIG. 8 is a diagram of a power module according to Embodiment 3 of this application.

Refer to FIG. 8. Embodiment 3 of this application provides a power module 10. A difference from Embodiment 1 lies in that a first power semiconductor chip T1 further includes a first input electrode, and a cathode of a first diode chip D1 is connected to the first input electrode. The power module 10 further includes a second power semiconductor chip T2, a second diode chip D2, and a second temperature sensor Dt2. The second power semiconductor chip T2 includes a second output electrode E2 and a second input electrode, and the second input electrode is electrically connected to the first input electrode. The second temperature sensor Dt2 is located inside the second power semiconductor chip T2, and is configured to detect a temperature of the second power semiconductor chip T2. The second temperature sensor Dt2 includes a second cathode KE2, and the second cathode KE2 is electrically connected to the second output electrode E2. A cathode of the second diode chip D2 is electrically connected to the first input electrode. When the second diode chip D2 generates a reverse recovery current, a voltage is generated between the second output electrode E2 of the second power semiconductor chip T2 and the second cathode KE2.

A circuit in FIG. 8 is a horizontal bridge topology circuit. In an implementation, both the second power semiconductor chip T2 and the first power semiconductor chip T1 are IGBT chips, and the second power semiconductor chip T2 and the first power semiconductor chip T1 are in a common collector connection. In an implementation, both the second power semiconductor chip T2 and the first power semiconductor chip T1 are MOSFET chips, and the second power semiconductor chip T2 and the first power semiconductor chip T1 are in a common-drain connection. In another implementation, the second power semiconductor chip T2 and the first power semiconductor chip T1 may alternatively be other active power semiconductor devices.

A second gate G2 is disposed on the second power semiconductor chip T2, and is configured to control turn-on and turn-off of the second power semiconductor chip T2. The second power semiconductor chip T2 is connected to the second diode chip D2 in anti-parallel, the cathode of the second diode chip D2 is connected to the second input electrode, and an anode of the second diode chip D2 is connected to the second output electrode E2. The second diode chip D2 is configured to protect the second power semiconductor chip T2. When the second power semiconductor chip T2 is turned off, a current in a loop suddenly changes. To protect the second power semiconductor chip T2 and the circuit, a current in the second power semiconductor chip T2 is released to the second diode chip D2, and a loop current is formed on the second diode chip D2 to consume the current and implement safe energy transfer. Then, a reverse recovery current is formed on the second diode chip D2. After passing through an external loop (a dashed line in FIG. 8), the reverse recovery current flows into the second power semiconductor chip T2 through the second input electrode. In an implementation, a first circuit board B1 is electrically connected to the second output electrode E2 and the second cathode KE2. The first circuit board B1 obtains a voltage difference between the second output electrode E2 and the second cathode KE2, and obtains a temperature of the second diode chip D2 based on the voltage difference.

An outer surface of the second temperature sensor Dt2 is electrically insulated from an outer surface of the second power semiconductor chip T2, and the second cathode KE2 is electrically connected to the second output electrode E2 through a connection cable, to implement an electrical connection between the second temperature sensor Dt2 and the second power semiconductor chip T2. In an implementation, the second temperature sensor Dt2 is a diode temperature sensor. In an implementation, the second temperature sensor Dt2 is located in a main area in which the second power semiconductor chip T2 generates a junction temperature. In an implementation, the second temperature sensor Dt2 further includes a second anode TSNR2, and the first circuit board B1 is electrically connected to the second anode TSNR2. The first circuit board B1 obtains a voltage difference between the second anode TSNR2 and the second cathode KE2, and obtains a temperature of the second power semiconductor chip T2 based on the voltage difference.

The first diode chip D1 is connected to the first power semiconductor chip T1 in anti-parallel, the cathode of the first diode chip D1 is connected to the first input electrode, and an anode of the first diode chip D1 is connected to the first output electrode E1. The first diode chip D1 is configured to protect the first power semiconductor chip T1. When the first power semiconductor chip T1 is turned off, a current in a loop suddenly changes. To protect the first power semiconductor chip T1 and the circuit, a current in the first power semiconductor chip T1 is released to the first diode chip D1, and a loop current is formed on the first diode chip D1 to consume the current and implement safe energy transfer. Then, a reverse recovery current is formed on the first diode chip D1. After passing through the external loop (the dashed line in FIG. 9), the reverse recovery current flows into the first power semiconductor chip T1 through the first input electrode. A temperature of the first diode chip D1 is obtained by measuring a voltage difference between the first output electrode E1 and the first cathode KE1.

In an implementation, the power module 10 further includes a second output pin E2' and a second cathode pin KE2'. The second output pin E2' and the second cathode pin KE2' are mounted on an edge of the second circuit board B2, the second output pin E2' is connected between the second output electrode E2 and the first circuit board B1, and the second cathode pin KE2' is connected between the second cathode KE2 and the first circuit board B1. The first circuit board B1 obtains a voltage difference between the second output pin E2' and the second cathode pin KE2', to obtain the temperature of the second diode chip D2.

In an implementation, the power module 10 further includes a second anode pin TSNR2'. The second anode pin TSNR2' is mounted on an edge of the second circuit board B2, and the second anode pin TSNR2' is connected between the second anode TSNR2 and the first circuit board B1. The first circuit board B1 obtains a voltage difference between the second anode pin TSNR2' and the second cathode pin KE2', to obtain the temperature of the second power semiconductor chip T2.

The second input electrode is connected to the first input electrode to form a COM port. The second output electrode E2 forms an SWL port. The first output electrode E1 forms an SWN port.

Embodiment 4

Figure 9:
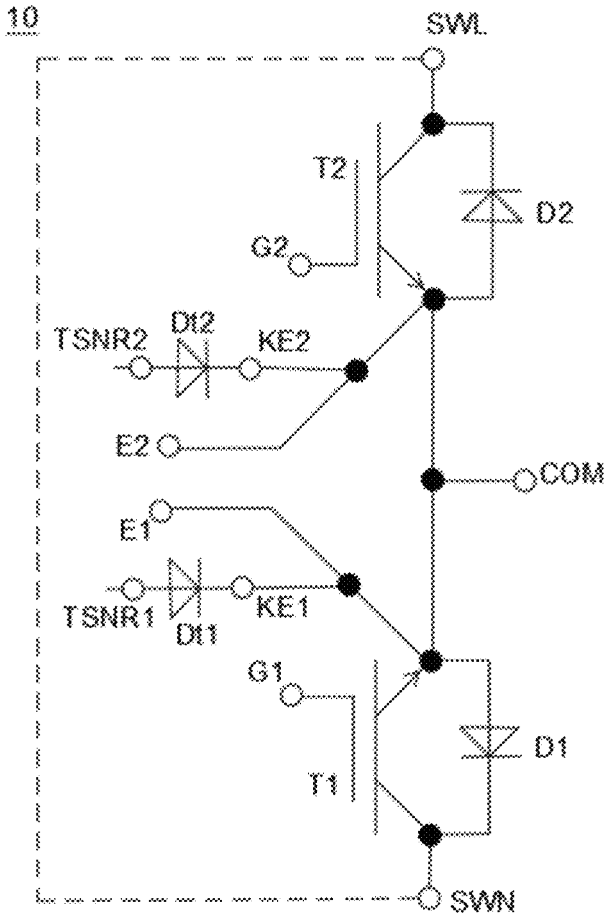
FIG. 9 is a diagram of a power module according to Embodiment 4 of this application.

Refer to FIG. 9. Embodiment 4 of this application provides a power module 10. A difference from Embodiment 1 lies in that an anode of a first diode chip D1 is connected to a first output electrode E1. The power module 10 further includes a second power semiconductor chip T2, a second diode chip D2, and a second temperature sensor Dt2. The second power semiconductor chip T2 includes a second output electrode E2, and the second output electrode E2 is electrically connected to the first output electrode E1. The second temperature sensor Dt2 is located inside the second power semiconductor chip T2, and is configured to detect a temperature of the second power semiconductor chip T2. The second temperature sensor Dt2 includes a second cathode KE2, and the second cathode KE2 is electrically connected to the second output electrode E2. An anode of the second diode chip D2 is electrically connected to the second output electrode E2. When the second diode chip D2 generates a reverse recovery current, a voltage is generated between the second output electrode E2 of the second power semiconductor chip T2 and the second cathode KE2.

The second power semiconductor chip T2 includes a second input electrode. A second gate G2 is disposed on the second power semiconductor chip T2, and is configured to control turn-on and turn-off of the second power semiconductor chip T2. The second power semiconductor chip T2 is connected to the second diode chip D2 in anti-parallel, a cathode of the second diode chip D2 is connected to the second input electrode, and the anode of the second diode chip D2 is connected to the second output electrode E2. The second diode chip D2 is configured to protect the second power semiconductor chip T2. When the second power semiconductor chip T2 is turned off, a current in a loop suddenly changes. To protect the second power semiconductor chip T2 and the circuit, a current in the second power semiconductor chip T2 is released to the second diode chip D2, and a loop current is formed on the second diode chip D2 to consume the current and implement safe energy transfer. Then, a reverse recovery current is formed on the second diode chip D2. After passing through an external loop (a dashed line in FIG. 9), the reverse recovery current flows into the second power semiconductor chip T2 through the second input electrode. In an implementation, a first circuit board B1 is electrically connected to the second output electrode E2 and the second cathode KE2. The first circuit board B1 obtains a voltage difference between the second output electrode E2 and the second cathode KE2, and obtains a temperature of the second diode chip D2 based on the voltage difference.

In an implementation, both the second power semiconductor chip T2 and the first power semiconductor chip T1 are IGBT chips, and the second power semiconductor chip T2 and the first power semiconductor chip T1 are in a common-emitter connection. In an implementation, both the second power semiconductor chip T2 and the first power semiconductor chip T1 are MOSFET chips, and the second power semiconductor chip T2 and the first power semiconductor chip T1 are in a common-source connection.

An outer surface of the second temperature sensor Dt2 is electrically insulated from an outer surface of the second power semiconductor chip T2, and the second cathode KE2 is electrically connected to the second output electrode E2 through a connection cable, to implement an electrical connection between the second temperature sensor Dt2 and the second power semiconductor chip T2. In an implementation, the second temperature sensor Dt2 is a diode temperature sensor. In an implementation, the second temperature sensor Dt2 is located in a main area in which the second power semiconductor chip T2 generates a junction temperature. In an implementation, the second temperature sensor Dt2 further includes a second anode TSNR2, and the first circuit board B1 is electrically connected to the second anode TSNR2. The first circuit board B1 obtains a voltage difference between the second anode TSNR2 and the second cathode KE2, and obtains the temperature of the second power semiconductor chip T2 based on the voltage difference.

The first diode chip D1 is connected to the first power semiconductor chip T1 in anti-parallel, a cathode of the first diode chip D1 is connected to a first input electrode, and the anode of the first diode chip D1 is connected to the first output electrode E1. The first diode chip D1 is configured to protect the first power semiconductor chip T1. When the first power semiconductor chip T1 is turned off, a current in a loop suddenly changes. To protect the first power semiconductor chip T1 and the circuit, a current in the first power semiconductor chip T1 is released to the first diode chip D1, and a loop current is formed on the first diode chip D1 to consume the current and implement safe energy transfer. Then, a reverse recovery current is formed on the first diode chip D1. After passing through the external loop (the dashed line in FIG. 9), the reverse recovery current flows into the first power semiconductor chip T1 through the first input electrode. A temperature of the first diode chip D1 is obtained by measuring a voltage difference between the first output electrode E1 and a first cathode KE1.

In an implementation, the power module 10 further includes a second output pin E2' and a second cathode pin KE2'. The second output pin E2' and the second cathode pin KE2' are mounted on an edge of the second circuit board B2, the second output pin E2' is connected between the second output electrode E2 and the first circuit board B1, and the second cathode pin KE2' is connected between the second cathode KE2 and the first circuit board B1. The first circuit board B1 obtains a voltage difference between the second output pin E2' and the second cathode pin KE2', to obtain the temperature of the second diode chip D2.

In an implementation, the power module 10 further includes a second anode pin TSNR2'. The second anode pin TSNR2' is mounted on an edge of the second circuit board B2, and the second anode pin TSNR2' is connected between the second anode TSNR2 and the first circuit board B1. The first circuit board B1 obtains a voltage difference between the second anode pin TSNR2' and the second cathode pin KE2', to obtain the temperature of the second power semiconductor chip T2.

The second output electrode E2 is connected to the first output electrode E1 to form a COM port. The second input electrode forms an SWL port. The first input electrode forms an SWN port.

Embodiment 5

Figure 10:
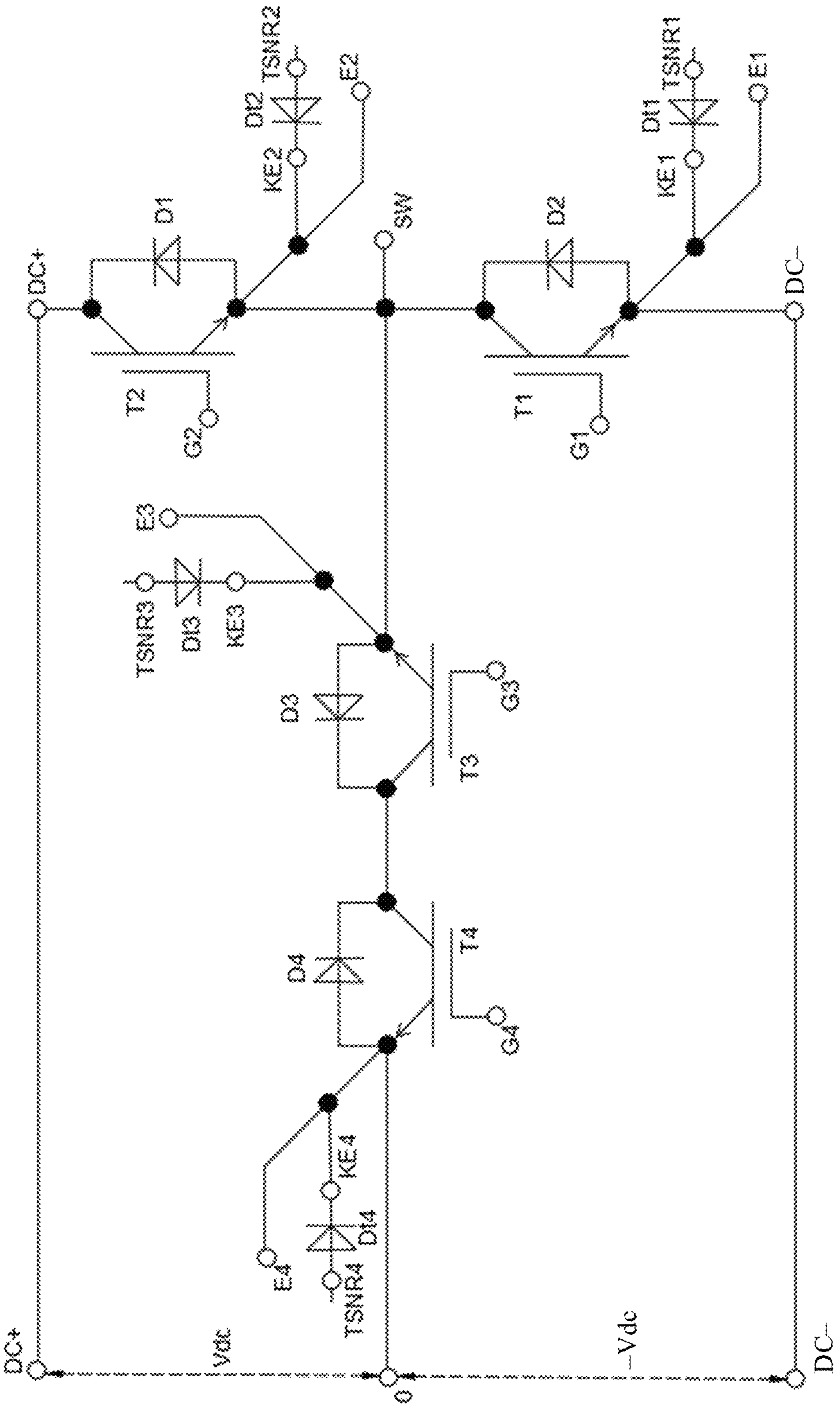
FIG. 10 is a diagram of a power module according to Embodiment 5 and Embodiment 6 of this application.

Refer to FIG. 10. Embodiment 5 of this application provides a power module 10. A difference from Embodiment 2 lies in that the power module 10 further includes a third power semiconductor chip T3, a third diode chip D3, and a third temperature sensor Dt3. The third power semiconductor chip T3 includes a third output electrode E3, and the third output electrode E3 is electrically connected to a first input electrode and a second output electrode E2. The third temperature sensor Dt3 is located inside the third power semiconductor chip T3, and is configured to detect a temperature of the third power semiconductor chip T3. The third temperature sensor Dt3 includes a third cathode KE3, and the third cathode KE3 is electrically connected to the third output electrode E3. An anode of the third diode chip D3 is electrically connected to the third output electrode E3. When the third diode chip D3 generates a reverse recovery current, an induced voltage is generated between the third output electrode E3 of the third power semiconductor chip T3 and the third cathode KE3.

A third gate G3 is disposed on the third power semiconductor chip T3, and is configured to control turn-on and turn-off of the third power semiconductor chip T3. The third power semiconductor chip T3 further includes a third input electrode, the third power semiconductor chip T3 is connected to the third diode chip D3 in anti-parallel, a cathode of the third diode chip D3 is connected to the third input electrode, and the anode of the third diode chip D3 is connected to the third output electrode E3.

The third diode chip D3 is configured to protect the third power semiconductor chip T3. When the third power semiconductor chip T3 is turned off, a current in a loop suddenly changes. To protect the third power semiconductor chip T3 and the circuit, a current in the third power semiconductor chip T3 is released to the third diode chip D3, and a loop current is formed on the third diode chip D3 to consume the current and implement safe energy transfer. Then, a reverse recovery current is formed on the third diode chip D3. After passing through an external loop, the reverse recovery current flows into the third power semiconductor chip T3 through the third input electrode. In an implementation, the first circuit board B1 is electrically connected to the third output electrode E3 and the third cathode KE3. The first circuit board B1 obtains a voltage difference between the third output electrode E3 and the third cathode KE3, and obtains a temperature of the third diode chip D3 based on the voltage difference.

An outer surface of the third temperature sensor Dt3 is electrically insulated from an outer surface of the third power semiconductor chip T3, and the third cathode KE3 is electrically connected to the third output electrode E3 through a connection cable, to implement an electrical connection between the third temperature sensor Dt3 and the third power semiconductor chip T3. In an implementation, the third temperature sensor Dt3 is a diode temperature sensor. In an implementation, the third temperature sensor Dt3 is located in a main area in which the third power semiconductor chip T3 generates a junction temperature. In an implementation, the third temperature sensor Dt3 further includes a third anode TSNR3, and the first circuit board B1 is electrically connected to the third anode TSNR3. The first circuit board B1 obtains a voltage difference between the third anode TSNR3 and the third cathode KE3, and obtains a temperature of the third power semiconductor chip T3 based on the voltage difference.

In an implementation, the power module 10 further includes a third output pin E3', a third cathode pin KE3', and a third anode pin TSNR3'. The third output pin E3', the third cathode pin KE3', and the third anode pin TSNR3' are mounted on an edge of the second circuit board B2. The third output pin E3' is connected between the third output electrode E3 and the first circuit board B1, the third cathode pin KE3' is connected between the third cathode KE3 and the first circuit board B1, and the third anode pin TSNR3' is connected between the third anode TSNR3 and the first circuit board B1. The first circuit board B1 obtains a voltage difference between the third output pin E3' and the third cathode pin KE3', to obtain the temperature of the third diode chip D3. The first circuit board B1 obtains a voltage difference between the third anode pin TSNR3' and the third cathode pin KE3', to obtain the temperature of the third power semiconductor chip T3.

Embodiment 6

Refer to FIG. 10. Embodiment 6 of this application provides a power module 10. A difference from Embodiment 5 lies in that a third power semiconductor chip T3 further includes a third input electrode. The power module 10 further includes a fourth power semiconductor chip T4, a fourth diode chip D4, and a fourth temperature sensor Dt4. The fourth power semiconductor chip T4 includes a fourth input electrode and a fourth output electrode E4, and the fourth input electrode is electrically connected to the third input electrode. The fourth temperature sensor Dt4 is located inside the fourth power semiconductor chip T4, and is configured to detect a temperature of the fourth power semiconductor chip T4. The fourth temperature sensor Dt4 includes a fourth cathode KE4, and the fourth cathode KE4 is electrically connected to the fourth output electrode E4. An anode of the fourth diode chip D4 is electrically connected to the fourth output electrode E4. When the fourth diode chip D4 generates a reverse recovery current, an induced voltage is generated between the fourth output electrode E4 of the fourth power semiconductor chip T4 and the fourth cathode KE4.

A fourth gate G4 is disposed on the fourth power semiconductor chip T4, and is configured to control turn-on and turn-off of the fourth power semiconductor chip T4. The fourth power semiconductor chip T4 further includes the fourth input electrode, the fourth power semiconductor chip T4 is connected to the fourth diode chip D4 in anti-parallel, a cathode of the fourth diode chip D4 is connected to the fourth input electrode, and the anode of the fourth diode chip D4 is connected to the fourth output electrode E4.

The fourth diode chip D4 is configured to protect the fourth power semiconductor chip T4. When the fourth power semiconductor chip T4 is turned off, a current in a loop suddenly changes. To protect the fourth power semiconductor chip T4 and the circuit, a current in the fourth power semiconductor chip T4 is released to the fourth diode chip D4, and a loop current is formed on the fourth diode chip D4 to consume the current and implement safe energy transfer. Then, a reverse recovery current is formed on the fourth diode chip D4. After passing through the external loop, the reverse recovery current flows into the fourth power semiconductor chip T4 through the fourth input electrode. In an implementation, a first circuit board B1 is electrically connected to the fourth output electrode E4 and the fourth cathode KE4. The first circuit board B1 obtains a voltage difference between the fourth output electrode E4 and the fourth cathode KE4, and obtains a temperature of the fourth diode chip D4 based on the voltage difference.

An outer surface of the fourth temperature sensor Dt4 is electrically insulated from an outer surface of the fourth power semiconductor chip T4, and the fourth cathode KE4 is electrically connected to the fourth output electrode E4 through a connection cable, to implement an electrical connection between the fourth temperature sensor Dt4 and the fourth power semiconductor chip T4. In an implementation, the fourth temperature sensor Dt4 is a diode temperature sensor. In an implementation, the fourth temperature sensor Dt4 is located in a main area in which the fourth power semiconductor chip T4 generates a junction temperature. In an implementation, the fourth temperature sensor Dt4 further includes a fourth anode TSNR4, and the first circuit board B1 is electrically connected to the fourth anode TSNR4. The first circuit board B1 obtains a voltage difference between the fourth anode TSNR4 and the fourth cathode KE4, and obtains the temperature of the fourth power semiconductor chip T4 based on the voltage difference.

In an implementation, the power module 10 further includes a fourth output pin E4', a fourth cathode pin KE4', and a fourth anode pin TSNR4'. The fourth output pin E4', the fourth cathode pin KE4', and the fourth anode pin TSNR4' are mounted on an edge of a second circuit board B2. The fourth output pin E4' is connected between the fourth output electrode E4 and the first circuit board B1, the fourth cathode pin KE4' is connected between the fourth cathode KE4 and the first circuit board B1, and the fourth anode pin TSNR4' is connected between the fourth anode TSNR4 and the first circuit board B1. The first circuit board B1 obtains a voltage difference between the fourth output pin E4' and the fourth cathode pin KE4', to obtain the temperature of the fourth diode chip D4. The first circuit board B1 obtains a voltage difference between the fourth anode pin TSNR4' and the fourth cathode pin KE4', to obtain the temperature of the fourth power semiconductor chip T4.

In an implementation, when a horizontal bridge topology is used in cooperation with a vertical bridge topology, the power module 10 is configured to convert a direct current into an alternating current. A positive voltage DC+ with a voltage of Vdc is input to a second input electrode, a negative voltage DC− with a voltage of −Vdc is input to a first output electrode E1, and a voltage input to the fourth input electrode is 0. An output port is an SW port, and switching of all switch states of power semiconductor chips in the power module 10 is a cyclic process. On and off states of the power semiconductor chips in the power module 10 are shown in Table 1, where "V" indicates the on state, and "x" indicates the off state.

TABLE 1

| On and off states of power semiconductor chips (T2 of a vertical bridge and T4/T3 of a horizontal bridge cannot be turned on at the same time) | | | | |
|---|---|---|---|---|
| Step | Second power semi-conductor chip T2 | Fourth power semi-conductor chip T4 | Third power semi-conductor chip T3 | First power semi-conductor chip T1 |
| Step 1 | ✓ | x | x | x |
| Step 2 | x | ✓ | x | x |
| Step 3 | x | x | x | ✓ |
| Step 4 | x | x | ✓ | x |
| Step 5 | ✓ | x | x | x |

A current conversion process of the power module 10 may be as follows:

Step 1: Turn on the second power semiconductor chip T2, and turn off the first power semiconductor chip T1, the third power semiconductor chip T3, and the fourth power semiconductor chip T4. A current flows from the DC+ end into the second power semiconductor chip T2 and is output from the output port SW, and an output voltage is Vdc. In this case, a temperature of the second power semiconductor chip T2 may be obtained by measuring a voltage difference between a second anode pin TSNR2' and a second cathode pin KE2'.

Step 2: Turn off the second power semiconductor chip T2, turn on the fourth power semiconductor chip T4, and keep the first power semiconductor chip T1 and the third power semiconductor chip T3 turned off. A current flows from a 0 end through the fourth power semiconductor chip T4 and the third diode chip D3 to the output port SW for output, and an output voltage is 0. In this case, the temperature of the fourth power semiconductor chip T4 may be obtained by measuring the voltage difference between the fourth anode pin TSNR4' and the fourth cathode pin KE4'.

Step 3: Turn on the first power semiconductor chip T1, turn off the fourth power semiconductor chip T4, and keep the second power semiconductor chip T2 and the third power semiconductor chip T3 turned off. An output voltage is −Vdc, and a current flows in from the output port SW and is output from the DC− end. In this case, the first power semiconductor chip T1 changes from an off state to an on state, and a reverse recovery current of D3 flows into the T1. A temperature of the third diode chip D3 may be obtained by measuring a voltage difference between a first output pin E1' and a first cathode pin KE1'. A temperature of the first power semiconductor chip T1 may be obtained by measuring a voltage difference between the first cathode pin KE1' and a first anode pin TSNR1' at the same time.

Step 4: Turn off the first power semiconductor chip T1, turn on the third power semiconductor chip T3, and keep the second power semiconductor chip T2 and the fourth power semiconductor chip T4 turned off. A current flows into the third power semiconductor chip T3 and the fourth diode chip D4 from the SW end and is output from the 0 end, and an output voltage is 0. In this case, a temperature of the third power semiconductor chip T3 may be reversely deduced by measuring a voltage difference between a third anode pin TSNR3' and a third cathode pin KE3'.

Step 5: Turn off the third power semiconductor chip T3, turn on the second power semiconductor chip T2, and keep the first power semiconductor chip T1 and the fourth power semiconductor chip T4 turned off. A current flows from the DC+ end into the second power semiconductor chip T2 and is output from the output port SW, and an output voltage is Vdc. In this case, the second power semiconductor chip T2 changes from the off state to the on state, and a reverse recovery current of D4 flows into T2. The temperature of the fourth diode chip D4 is obtained by measuring a voltage difference between a second output pin E2' and the second cathode pin KE2'. The temperature of the second power semiconductor chip T2 may be obtained by measuring the voltage difference between the second anode pin TSNR2' and the second cathode pin KE2'.

The foregoing steps are repeated so that an output voltage of the power module 10 is switched among Vdc, 0, −Vdc, 0, and Vdc. Setting of a horizontal bridge circuit enables the power module 10 to increase a level, and the output voltage of the power module 10 can be closer to a sine output voltage.

A working process of the power module 10 is not limited to the foregoing. In another implementation, the "0" end may alternatively be another value, and more levels may be added to the power module 10 by adding a plurality of horizontal bridges.

Embodiment 7

Figure 11:
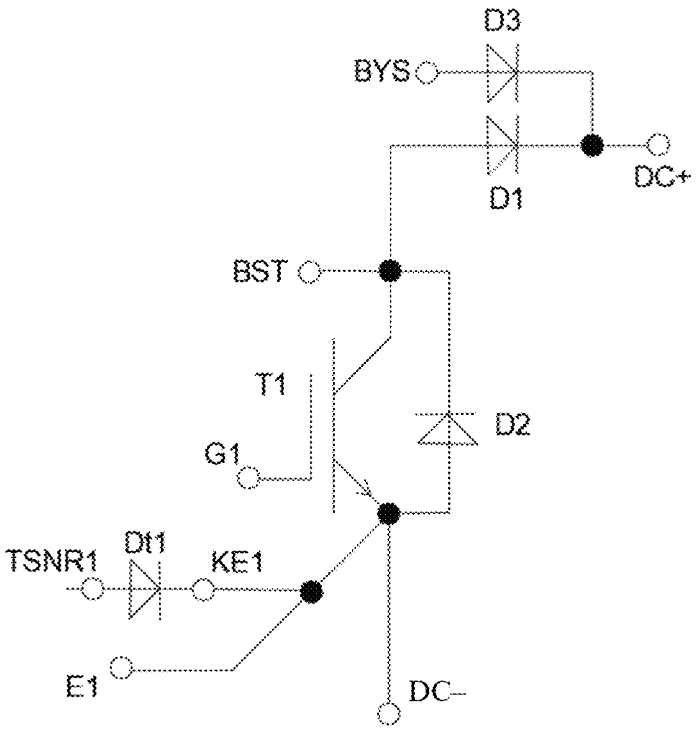
FIG. 11 is a diagram of a power module according to Embodiment 7 of this application.

Refer to FIG. 11. Embodiment 7 of this application provides a power module 10. A difference from Embodiment 1 lies in that a first power semiconductor chip T1 further includes a first input electrode, and the first input electrode is electrically connected to an anode of a first diode chip D1. The power module 10 further includes a second diode chip D2 and a third diode chip D3. A cathode of the second diode chip D2 is electrically connected to the first input electrode. When the first power semiconductor chip T1 is turned off, the second diode chip D2 is configured to protect the first power semiconductor chip T1. A cathode of the third diode chip D3 is electrically connected to a cathode of the first diode chip D1, and the third diode chip D3 is configured to prevent the first diode chip D1 from being broken down by an overvoltage.

The first input electrode of the first power semiconductor chip T1 is connected to the anode of the first diode chip D1 to form a BST port. A first output electrode E1 of the first power semiconductor chip T1 is connected to a negative electrode DC− of a direct current bus. The cathode of the first diode chip D1 is connected to a positive electrode DC+ of the direct current bus, and an anode of the third diode chip D3 forms a BYS port. A second voltage difference VAK between a first anode TSNR1 and a first cathode KE1 is measured and a temperature of the first power semiconductor chip T1 is obtained based on the second voltage difference VAK. A temperature of the first diode chip D1 is obtained by measuring a first voltage difference VEKE between the first output electrode E1 and the first cathode KE1.

The second diode chip D2 is connected to a first IGBT chip T1 in anti-parallel, in other words, the cathode of the second diode chip D2 is connected to the first input electrode. An anode of the second diode chip D2 is electrically connected to the first output electrode E1, and the second diode chip D2 is configured to protect a circuit. When the first power semiconductor chip T1 changes from an on state to an off state, a loop is formed on the second diode chip D2 to consume a current and implement safe energy transfer.

In an implementation, the third diode chip D3 is a high-voltage diode, and the third diode chip D3 and the first diode chip D1 are connected in parallel. The cathode of the third diode chip D3 is connected to the cathode of the first diode chip D1, and the third diode chip D3 is configured to prevent the first diode chip D1 from being broken down by an overvoltage.

Figure 12:
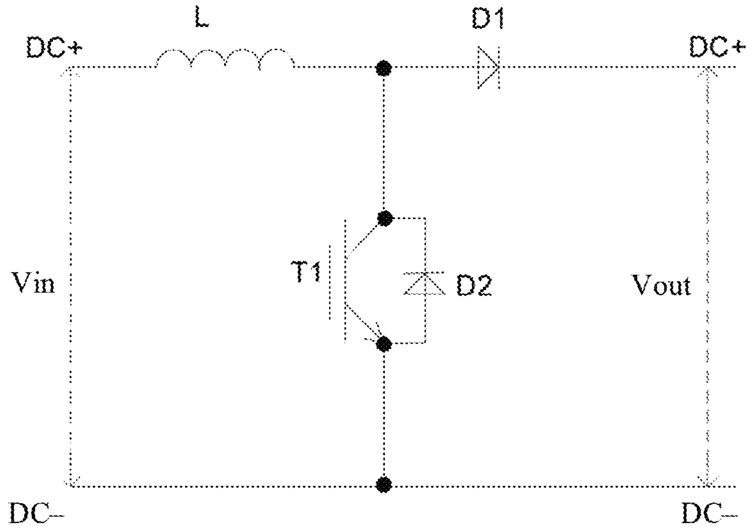
FIG. 12 is a schematic of a boost circuit according to an implementation of this application.
Figure 13:
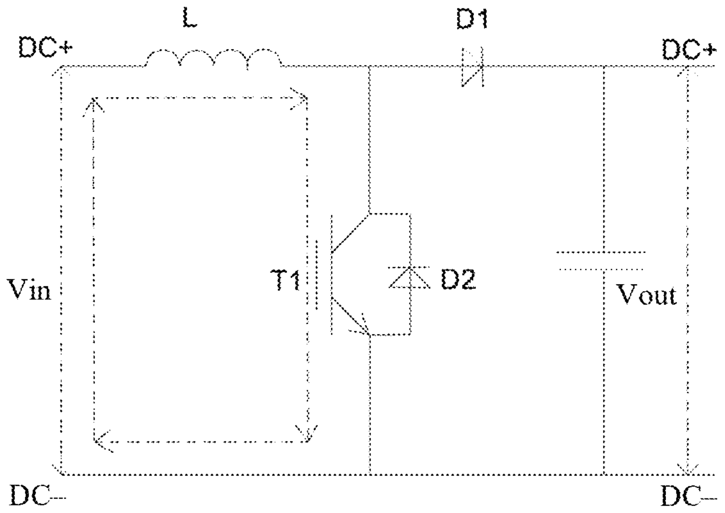
FIG. 13 is a schematic of a boost circuit according to an implementation of this application.
Figure 14:
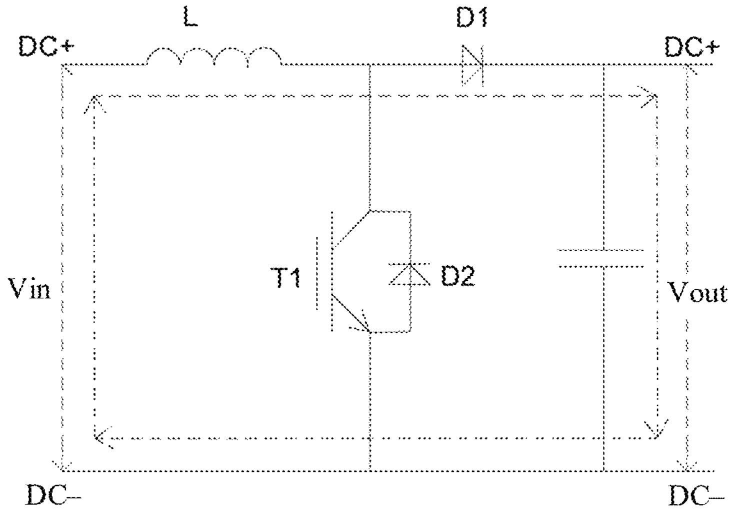
FIG. 14 is a schematic of a boost circuit according to an implementation of this application.

When the power module 10 is used in a boost circuit, as shown in FIG. 12, the boost circuit further includes an inductor L. The inductor Lis electrically connected to the first input electrode and the anode of the first diode chip D1. The boost circuit is a voltage step-up circuit, and can enable an output voltage Vout to be higher than an input voltage Vin. The first diode chip D1 is a boost diode. When the first power semiconductor chip T1 is turned on, the input voltage Vin charges the inductor L, and a current passes through the inductor L and the first power semiconductor chip T1 to form a loop (as shown in FIG. 13). The current flows from a collector of the first power semiconductor chip T1 to an emitter of the first power semiconductor chip T1, and no current passes through the first diode chip D1. When the first power semiconductor chip T1 is turned off, the current passes through the inductor L and the first diode chip D1 to form a loop (as shown in FIG. 14), and the input voltage Vin discharges a load through the first diode chip D1. At the same time, energy stored in the inductor L also discharges to load through the first diode chip D1, and the input voltage Vin combined with an induced voltage on the inductor L is the output voltage Vout, to implement voltage boosting. In this case, the current flows from the anode of the first diode chip D1 to the cathode of the first diode chip D1. When the first power semiconductor chip T1 is turned on again, the current passes through the inductor L and the first power semiconductor chip T1 to form a loop. After the current in the first diode chip D1 decreases to zero, a reverse recovery current is generated. The reverse recovery current flows from the cathode of the first diode chip D1 to the anode of the first diode chip D1, and the reverse recovery current may flow into the first power semiconductor chip T1. In this case, a voltage difference between a pin E and a pin KE is measured, the temperature of the first diode chip D1 may be reversely deduced, and the temperature of the first power semiconductor chip T1 may be obtained by measuring the voltage difference between the first output electrode E1 and the first cathode KE1.

Figure 15:
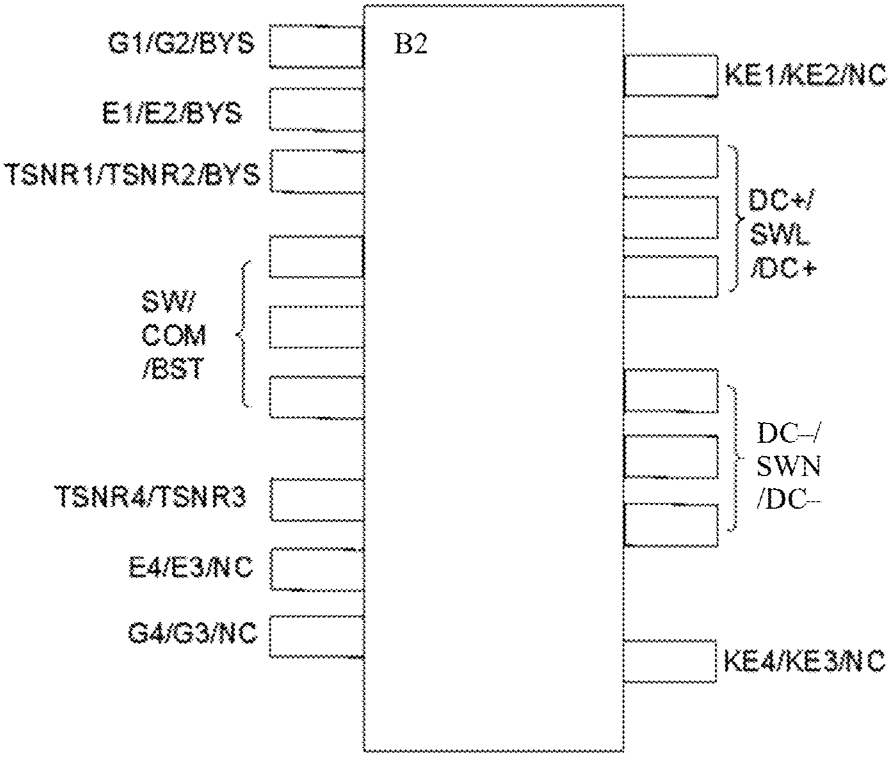
FIG. 15 is a diagram of a pin layout according to an implementation of this application.

Refer to FIG. 15. In an implementation, the power module 10 includes a vertical bridge topology, a horizontal bridge topology, and a boost topology at the same time, and the three topologies may all use a same pin-out layout manner. The pins are named according to a sequence of electrical ports corresponding to the vertical bridge topology, the horizontal bridge topology, and the boost topology. The pin-out manner is compatible with the preceding three common topologies as long as a wiring manner is changed inside the module. This pin-out manner reduces customized packaging costs of various topologies, and each pin can be fully applied. In an implementation, an NC pin is vacant in the boost topology.

The foregoing describes in detail the power module and the power supply system provided in embodiments of this application. Specific examples are used in this specification to describe principles and embodiments of this application. The foregoing embodiments are merely used to help understand the method and core ideas of this application. In addition, a person of ordinary skill in the art may make modifications to the specific embodiments and application scopes according to the ideas of this application. In conclusion, the content of this specification shall not be construed as a limit to this application.

What is claimed is:

1. A power module, wherein the power module comprises:

a first power semiconductor chip, comprising a first output electrode;

a first temperature sensor, located inside the first power semiconductor chip, and configured to detect a temperature of the first power semiconductor chip, wherein the first temperature sensor comprises a first cathode, and the first cathode is electrically connected to the first output electrode;

a first diode chip, electrically connected to the first power semiconductor chip, wherein when the first diode chip generates a reverse recovery current, a voltage is generated between the first output electrode and the first cathode; and a first circuit board, wherein the first circuit board is electrically connected to the first output electrode and the first cathode, and the first circuit board is configured to obtain a first voltage difference between the first output electrode and the first cathode, and obtain a temperature of the first diode chip based on the first voltage difference.

2. The power module according to claim 1, wherein there is at least one of a via hole, a connection line, or a connection metal layer between the first output electrode and the first cathode.

3. The power module according to claim 1, wherein the power module further comprises a second circuit board, a first output pin, and a first cathode pin, and the first power semiconductor chip and the first diode chip are mounted on the second circuit board, the first output pin and the first cathode pin are mounted on an edge of the second circuit board, the first output pin is connected between the first output electrode and the first circuit board, the first cathode pin is connected between the first cathode and the first circuit board, and the first circuit board obtains the first voltage difference by using the first output pin and the first cathode pin.

4. The power module according to claim 1, wherein the first power semiconductor chip further comprises a first input electrode, the first input electrode is electrically connected to an anode of the first diode chip, and the power module further comprises a second power semiconductor chip, a second diode chip, and a second temperature sensor;

the second power semiconductor chip comprises a second output electrode, and the second output electrode is electrically connected to the first input electrode;

the second temperature sensor is located inside the second power semiconductor chip, and is configured to detect a temperature of the second power semiconductor chip, wherein the second temperature sensor comprises a second cathode, and the second cathode is electrically connected to the second output electrode;

a cathode of the second diode chip is electrically connected to the second output electrode, the cathode of the second diode chip is electrically connected to the first input electrode, and when the second diode chip generates a reverse recovery current, a voltage is generated between the second output electrode and the second cathode; and the first circuit board is further electrically connected to the second output electrode and the second cathode, and the first circuit board is configured to obtain a voltage difference between the second output electrode and the second cathode, and obtain a temperature of the second diode chip based on the voltage difference between the second output electrode and the second cathode.

5. The power module according to claim 1, wherein the first power semiconductor chip further comprises a first input electrode, a cathode of the first diode chip is connected to the first input electrode, and the power module further comprises a second power semiconductor chip, a second diode chip, and a second temperature sensor;

the second power semiconductor chip comprises a second output electrode and a second input electrode, and the second input electrode is electrically connected to the first input electrode;

the second temperature sensor is located inside the second power semiconductor chip, and is configured to detect a temperature of the second power semiconductor chip, wherein the second temperature sensor comprises a second cathode, and the second cathode is electrically connected to the second output electrode;

a cathode of the second diode chip is electrically connected to the second input electrode, and when the second diode chip generates a reverse recovery current, a voltage is generated between the second output electrode and the second cathode; and the first circuit board is further electrically connected to the second output electrode and the second cathode, and the first circuit board is configured to obtain a voltage difference between the second output electrode and the second cathode, and obtain a temperature of the second diode chip based on the voltage difference between the second output electrode and the second cathode.

6. The power module according to claim 1, wherein an anode of the first diode chip is connected to the first output electrode, and the power module further comprises a second power semiconductor chip, a second diode chip, and a second temperature sensor;

the second power semiconductor chip comprises a second output electrode, and the second output electrode is electrically connected to the first output electrode;

the second temperature sensor is located inside the second power semiconductor chip, and is configured to detect a temperature of the second power semiconductor chip, wherein the second temperature sensor comprises a second cathode, and the second cathode is electrically connected to the second output electrode;

an anode of the second diode chip is electrically connected to the second output electrode, and when the second diode chip generates a reverse recovery current, a voltage is generated between the second output electrode and the second cathode; and the first circuit board is further electrically connected to the second output electrode and the second cathode, and the first circuit board is configured to obtain a voltage difference between the second output electrode and the second cathode, and obtain a temperature of the second diode chip based on the voltage difference between the second output electrode and the second cathode.

7. The power module according to claim 1, wherein the first power semiconductor chip further comprises a first input electrode, the first input electrode is electrically connected to an anode of the first diode chip, and the power module further comprises a second diode chip and a third diode chip;

a cathode of the second diode chip is electrically connected to the first input electrode, and when the first power semiconductor chip is turned off, the second diode chip is configured to protect the first power semiconductor chip; and a cathode of the third diode chip is electrically connected to a cathode of the first diode chip, and the third diode chip is configured to prevent the first diode chip from being broken down by an overvoltage.

8. The power module according to claim 1, wherein the first temperature sensor further comprises a first anode, the first circuit board is electrically connected to the first anode, and the first circuit board obtains a second voltage difference between the first anode and the first cathode, and obtains the temperature of the first power semiconductor chip based on the second voltage difference.

9. A power supply system, wherein the power supply system comprises a power supply, a power-consuming device, and a power module and the power module comprises:

a first power semiconductor chip, comprising a first output electrode;

a first temperature sensor, located inside the first power semiconductor chip, and configured to detect a temperature of the first power semiconductor chip, wherein the first temperature sensor comprises a first cathode, and the first cathode is electrically connected to the first output electrode;

a first diode chip, electrically connected to the first power semiconductor chip, wherein when the first diode chip generates a reverse recovery current, a voltage is generated between the first output electrode and the first cathode; and a first circuit board, wherein the first circuit board is electrically connected to the first output electrode and the first cathode, and the first circuit board is configured to obtain a first voltage difference between the first output electrode and the first cathode, and obtain a temperature of the first diode chip based on the first voltage difference, wherein the power supply is connected to an input end of the power module, and the power-consuming device is connected to an output end of the power module.

10. A vehicle, wherein the vehicle comprises a vehicle body and the power supply system according to claim 9, and the power supply system is mounted on the vehicle body.

11. A photovoltaic system, comprising a photovoltaic module and a power module, the power module comprising:

a first power semiconductor chip, comprising a first output electrode;

a first temperature sensor, located inside the first power semiconductor chip, and configured to detect a temperature of the first power semiconductor chip, wherein the first temperature sensor comprises a first cathode, and the first cathode is electrically connected to the first output electrode;

a first diode chip, electrically connected to the first power semiconductor chip, wherein when the first diode chip generates a reverse recovery current, a voltage is generated between the first output electrode and the first cathode; and a first circuit board, wherein the first circuit board is electrically connected to the first output electrode and the first cathode, and the first circuit board is configured to obtain a first voltage difference between the first output electrode and the first cathode, and obtain a temperature of the first diode chip based on the first voltage difference, wherein the photovoltaic module is electrically connected to the power module, and a direct current generated by the photovoltaic module is converted into an alternating current by using the power module.

* * * * *